(12) United States Patent
Helferich

(10) Patent No.: US 7,843,314 B2
(45) Date of Patent: *Nov. 30, 2010

(54) PAGING TRANSCEIVERS AND METHODS FOR SELECTIVELY RETRIEVING MESSAGES

(75) Inventor: Richard J. Helferich, Encinitas, CA (US)

(73) Assignee: Wireless Science, LLC, Chatsworth, CA (US)

( * ) Notice: Subject to any disclaimer, the term of this patent is extended or adjusted under 35 U.S.C. 154(b) by 834 days.

This patent is subject to a terminal disclaimer.

(21) Appl. No.: 11/635,781

(22) Filed: Dec. 8, 2006

(65) Prior Publication Data

US 2007/0155437 A1    Jul. 5, 2007

Related U.S. Application Data

(60) Continuation of application No. 11/050,775, filed on Feb. 7, 2005, now Pat. No. 7,155,241, which is a division of application No. 09/688,321, filed on Oct. 13, 2000, now Pat. No. 7,003,304, which is a division of application No. 08/934,143, filed on Sep. 19, 1997, now Pat. No. 6,233,430.

(51) Int. Cl.
*G08B 5/22* (2006.01)
*H04Q 1/30* (2006.01)

(52) U.S. Cl. ............ 340/7.21; 340/7.52; 340/825.37; 455/458; 455/466; 455/550.1

(58) Field of Classification Search ............ 340/7.21, 340/7.52, 825.37; 455/458, 466, 550.1, 100, 455/90, 95, 414.1, 421.1
See application file for complete search history.

(56) References Cited

U.S. PATENT DOCUMENTS 2,003,576 A    6/1935    Buhren (Continued)

FOREIGN PATENT DOCUMENTS

EP    631419    12/1994

(Continued)

OTHER PUBLICATIONS

Khare, R., et al., "Scenarios for an Internet-Scale Event Notification Service (ISENS)", Internet-Draft, Aug. 13, 1998, 18 pages.

(Continued)

*Primary Examiner*—Brian A Zimmerman
*Assistant Examiner*—Nam V Nguyen
(74) *Attorney, Agent, or Firm*—Steven G. Lisa, Ltd.; Jon E. Kappes; James David Busch

(57) ABSTRACT

A paging transceiver and method for selectively paging provides a page to a paging transceiver but does not automatically provide an associated message. The paging transceiver receives the page and alerts the user that a message is waiting and preferably provides a short description of the message. The user can then download or otherwise act on the message at a time and at a place convenient to the user. The user can therefore place the paging transceiver in a location where it can easily receive and reply to the message. The paging system conserves air time and the paging transceiver conserves memory by not automatically receiving the associated messages. The user can determine the time at which the paging transceiver receives transmissions, such as during off-peak hours. The messages stored by the systems and delivered to the paging transceiver may be of different types, such as voice, text, audio, or even video. In addition to messages, the paging system can store other information for the user, such as songs or video clips that the user can sample or updates on weather or stock rates.

1 Claim, 12 Drawing Sheets

U.S. PATENT DOCUMENTS

| | | |
|---|---|---|
| 3,118,145 A | 1/1964 | Nee |
| 3,794,983 A | 2/1974 | Sahin |
| 4,039,761 A | 8/1977 | Nicoud et al. |
| 4,042,906 A | 8/1977 | Ezell |
| 4,124,773 A | 11/1978 | Elkins |
| 4,371,752 A | 2/1983 | Matthews et al. |
| 4,412,217 A | 10/1983 | Willard et al. |
| 4,468,813 A | 8/1984 | Burke et al. |
| 4,480,253 A | 10/1984 | Anderson |
| 4,495,647 A | 1/1985 | Burke et al. |
| 4,549,047 A | 10/1985 | Brian et al. |
| 4,573,140 A | 2/1986 | Szeto |
| 4,602,129 A | 7/1986 | Matthews et al. |
| 4,640,991 A | 2/1987 | Matthews et al. |
| 4,644,352 A | 2/1987 | Fujii |
| 4,710,955 A | 12/1987 | Kauffman |
| 4,713,837 A | 12/1987 | Gordon |
| 4,737,979 A | 4/1988 | Hashimoto |
| 4,769,641 A | 9/1988 | Yoshizawa et al. |
| 4,769,642 A | 9/1988 | Davis et al. |
| 4,786,902 A | 11/1988 | Davis et al. |
| 4,807,155 A | 2/1989 | Cree et al. |
| H610 H | 3/1989 | Focarile et al. |
| 4,811,376 A | 3/1989 | Davis et al. |
| 4,812,843 A | 3/1989 | Champion, III et al. |
| 4,821,308 A | 4/1989 | Hashimoto |
| 4,825,456 A | 4/1989 | Rosenberg |
| 4,837,800 A | 6/1989 | Freeburg et al. |
| 4,845,491 A | 7/1989 | Fascenda et al. |
| 4,853,688 A | 8/1989 | Andros et al. |
| 4,858,232 A | 8/1989 | Diaz et al. |
| 4,864,301 A | 9/1989 | Helferich |
| 4,868,560 A | 9/1989 | Oliwa et al. |
| 4,873,520 A | 10/1989 | Fisch et al. |
| 4,885,577 A | 12/1989 | Nelson |
| 4,897,835 A | 1/1990 | Gaskill et al. |
| 4,905,003 A | 2/1990 | Helferich |
| 4,916,737 A | 4/1990 | Chomet et al. |
| 4,942,598 A | 7/1990 | Davis |
| 4,961,216 A | 10/1990 | Baehr et al. |
| 4,965,569 A | 10/1990 | Bennett et al. |
| 4,975,694 A | 12/1990 | McLaughlin et al. |
| 5,003,576 A | 3/1991 | Helferich |
| 5,005,013 A | 4/1991 | Tsukamoto et al. |
| 5,007,105 A | 4/1991 | Kudoh et al. |
| 5,029,199 A | 7/1991 | Jones et al. |
| 5,040,204 A | 8/1991 | Sasaki et al. |
| 5,043,721 A | 8/1991 | May |
| 5,047,763 A | 9/1991 | Kuznicki et al. |
| 5,065,423 A | 11/1991 | Gaskill |
| 5,070,536 A | 12/1991 | Mahany et al. |
| 5,093,659 A | 3/1992 | Yamada |
| 5,093,901 A | 3/1992 | Cree et al. |
| 5,115,233 A | 5/1992 | Zdunek et al. |
| 5,117,449 A | 5/1992 | Metroka et al. |
| 5,128,980 A | 7/1992 | Choi |
| 5,128,981 A | 7/1992 | Tsukamoto et al. |
| 5,134,724 A | 7/1992 | Gehring et al. |
| 5,138,311 A | 8/1992 | Weinberg |
| 5,138,312 A | 8/1992 | Tsukamoto et al. |
| 5,140,419 A | 8/1992 | Galumbeck et al. |
| 5,146,612 A | 9/1992 | Grosjean et al. |
| 5,153,903 A | 10/1992 | Eastmond et al. |
| 5,159,331 A | 10/1992 | Park et al. |
| 5,159,592 A | 10/1992 | Perkins |
| 5,159,713 A | 10/1992 | Gaskill et al. |
| 5,173,688 A | 12/1992 | DeLuca et al. |
| 5,175,758 A | 12/1992 | Levanto et al. |
| 5,177,780 A | 1/1993 | Kasper et al. |
| 5,182,553 A | 1/1993 | Kung |
| 5,185,604 A | 2/1993 | Nepple et al. |
| 5,192,947 A | 3/1993 | Neustein |
| 5,194,857 A | 3/1993 | Gomez |
| 5,212,636 A | 5/1993 | Nakazawa |
| 5,220,366 A | 6/1993 | King |
| 5,227,774 A | 7/1993 | Benoist |
| 5,239,466 A | 8/1993 | Morgan et al. |
| 5,239,679 A | 8/1993 | Murai |
| 5,241,305 A | 8/1993 | Fascenda et al. |
| 5,247,700 A | 9/1993 | Wohl et al. |
| 5,249,230 A | 9/1993 | Mihm, Jr. |
| 5,257,307 A | 10/1993 | Ise |
| 5,265,033 A | 11/1993 | Vajk et al. |
| 5,283,818 A | 2/1994 | Klausner et al. |
| 5,285,426 A | 2/1994 | Teodoridis |
| 5,285,496 A | 2/1994 | Frank et al. |
| 5,315,635 A | 5/1994 | Kane et al. |
| 5,329,501 A | 7/1994 | Meister et al. |
| 5,329,550 A | 7/1994 | Rousseau et al. |
| 5,333,266 A | 7/1994 | Boaz et al. |
| 5,375,161 A | 12/1994 | Fuller et al. |
| 5,379,031 A | 1/1995 | Mondrosch et al. |
| 5,390,362 A | 2/1995 | Modjeska et al. |
| 5,396,537 A | 3/1995 | Schwendeman |
| 5,396,547 A | 3/1995 | Baals et al. |
| 5,398,021 A | 3/1995 | Moore |
| 5,402,466 A | 3/1995 | Delahanty |
| 5,406,557 A | 4/1995 | Baudoin |
| 5,410,302 A | 4/1995 | Dulaney, III et al. |
| 5,418,835 A | 5/1995 | Frohman et al. |
| 5,420,922 A | 5/1995 | Lundblad et al. |
| RE34,976 E | 6/1995 | Helferich et al. |
| 5,426,422 A | 6/1995 | Vanden Heuvel et al. |
| 5,426,594 A | 6/1995 | Wright et al. |
| 5,428,663 A | 6/1995 | Grimes et al. |
| 5,428,784 A | 6/1995 | Cahill, Jr. |
| 5,432,839 A | 7/1995 | DeLuca |
| 5,436,960 A | 7/1995 | Campana, Jr. et al. |
| 5,438,611 A | 8/1995 | Campana, Jr. et al. |
| 5,440,559 A | 8/1995 | Gaskill |
| 5,442,706 A | 8/1995 | Kung |
| 5,444,671 A | 8/1995 | Tschannen et al. |
| 5,448,759 A | 9/1995 | Krebs et al. |
| 5,452,356 A | 9/1995 | Albert |
| 5,455,579 A | 10/1995 | Bennett et al. |
| 5,455,823 A | 10/1995 | Noreen et al. |
| 5,457,732 A | 10/1995 | Goldberg |
| 5,463,672 A | 10/1995 | Kage |
| 5,473,143 A | 12/1995 | Vak et al. |
| 5,473,320 A | 12/1995 | DeLuca et al. |
| 5,473,667 A | 12/1995 | Neustein |
| 5,475,653 A | 12/1995 | Yamada et al. |
| 5,475,863 A | 12/1995 | Simpson et al. |
| 5,475,866 A | 12/1995 | Ruthenberg |
| 5,479,378 A | 12/1995 | Yamada et al. |
| 5,479,408 A | 12/1995 | Will |
| 5,479,472 A | 12/1995 | Campana, Jr. et al. |
| 5,481,255 A | 1/1996 | Albert et al. |
| 5,483,352 A | 1/1996 | Fukuyama et al. |
| 5,483,595 A | 1/1996 | Owen |
| 5,485,503 A | 1/1996 | Diem |
| 5,487,100 A | 1/1996 | Kane |
| 5,487,167 A | 1/1996 | Dinallo et al. |
| 5,489,894 A | 2/1996 | Murray |
| 5,493,692 A | 2/1996 | Theimer et al. |
| 5,497,373 A | 3/1996 | Hulen et al. |
| 5,506,886 A | 4/1996 | Maine et al. |
| 5,524,009 A | 6/1996 | Tuutijarvi et al. |
| 5,530,438 A | 6/1996 | Bickham et al. |
| 5,530,930 A | 6/1996 | Hahn |
| 5,544,321 A | 8/1996 | Theimer et al. |
| 5,550,535 A | 8/1996 | Park |
| 5,555,376 A | 9/1996 | Theimer et al. |
| 5,555,446 A | 9/1996 | Jasinski |

| | | | | | |
|---|---|---|---|---|---|
| 5,557,606 A | 9/1996 | Moon et al. | 5,787,345 A | 7/1998 | Moon |
| 5,557,659 A | 9/1996 | Hyde-Thomson | 5,796,394 A | 8/1998 | Wicks et al. |
| 5,557,749 A | 9/1996 | Norris | 5,797,091 A | 8/1998 | Clise et al. |
| 5,559,800 A | 9/1996 | Mousseau et al. | 5,802,165 A | 9/1998 | Kim |
| 5,559,862 A | 9/1996 | Bhagat et al. | 5,802,466 A | 9/1998 | Gallant et al. |
| 5,561,702 A | 10/1996 | Lipp et al. | 5,805,886 A | 9/1998 | Skarbo et al. |
| 5,564,018 A | 10/1996 | Flores et al. | 5,809,130 A | 9/1998 | Ayala |
| 5,568,540 A | 10/1996 | Greco et al. | 5,809,413 A | 9/1998 | Meche et al. |
| 5,572,196 A | 11/1996 | Sakumoto et al. | 5,809,415 A | 9/1998 | Rossmann |
| 5,572,488 A | 11/1996 | Yamada et al. | 5,809,424 A | 9/1998 | Eizenhoefer |
| 5,579,372 A | 11/1996 | Astrom | 5,812,639 A | 9/1998 | Bartholomew et al. |
| 5,581,366 A | 12/1996 | Merchant et al. | 5,812,671 A | 9/1998 | Ross, Jr. |
| 5,581,593 A | 12/1996 | Engelke et al. | 5,812,795 A | 9/1998 | Horovitz et al. |
| 5,588,009 A | 12/1996 | Will | 5,812,865 A | 9/1998 | Theimer et al. |
| 5,590,092 A | 12/1996 | Fehnel | 5,815,800 A | 9/1998 | Su et al. |
| 5,592,532 A | 1/1997 | Koizumi et al. | 5,826,191 A | 10/1998 | Krishnan |
| 5,600,703 A | 2/1997 | Dang et al. | 5,828,882 A | 10/1998 | Hinckley |
| 5,600,708 A | 2/1997 | Meche et al. | 5,835,089 A | 11/1998 | Skarbo et al. |
| 5,603,054 A | 2/1997 | Theimer et al. | 5,838,252 A | 11/1998 | Kikinis |
| 5,604,788 A | 2/1997 | Tett | 5,841,837 A | 11/1998 | Fuller et al. |
| 5,608,446 A | 3/1997 | Carr et al. | 5,845,211 A | 12/1998 | Roach, Jr. |
| 5,608,786 A | 3/1997 | Gordon | 5,850,594 A | 12/1998 | Cannon et al. |
| 5,611,050 A | 3/1997 | Theimer et al. | 5,857,020 A | 1/1999 | Peterson, Jr. |
| 5,623,242 A | 4/1997 | Dawson, Jr. et al. | 5,862,325 A | 1/1999 | Reed et al. |
| 5,625,870 A | 4/1997 | Moon | 5,864,606 A | 1/1999 | Hanson et al. |
| 5,627,525 A | 5/1997 | Kudoh et al. | 5,870,030 A | 2/1999 | DeLuca et al. |
| 5,627,876 A | 5/1997 | Moon | 5,870,454 A | 2/1999 | Dahlen |
| 5,630,060 A | 5/1997 | Tang et al. | 5,872,779 A | 2/1999 | Vaudreuil |
| 5,630,207 A | 5/1997 | Gitlin et al. | 5,872,847 A | 2/1999 | Boyle et al. |
| 5,631,635 A | 5/1997 | Robertson | 5,872,926 A | 2/1999 | Levac et al. |
| 5,631,948 A | 5/1997 | Bartholomew et al. | 5,875,436 A | 2/1999 | Kikinis |
| 5,633,916 A | 5/1997 | Goldhagen et al. | 5,878,230 A | 3/1999 | Weber et al. |
| 5,635,918 A | 6/1997 | Tett | 5,878,351 A | 3/1999 | Alanara et al. |
| 5,636,265 A | 6/1997 | O'Connell et al. | 5,884,159 A | 3/1999 | Thro et al. |
| 5,638,369 A | 6/1997 | Ayerst et al. | 5,884,160 A | 3/1999 | Kanazaki |
| 5,644,627 A | 7/1997 | Segal et al. | 5,887,249 A | 3/1999 | Schmid |
| 5,649,305 A | 7/1997 | Yoshida | 5,889,852 A | 3/1999 | Rosecrans et al. |
| 5,652,789 A | 7/1997 | Miner et al. | 5,892,909 A | 4/1999 | Grasso et al. |
| 5,654,942 A | 8/1997 | Akahane | 5,893,032 A | 4/1999 | Maeda et al. |
| 5,661,782 A | 8/1997 | Bartholomew et al. | 5,895,471 A | 4/1999 | King et al. |
| 5,663,703 A | 9/1997 | Pearlman et al. | 5,903,723 A | 5/1999 | Beck et al. |
| 5,668,880 A | 9/1997 | Alajajian | 5,905,495 A | 5/1999 | Tanaka et al. |
| 5,675,507 A | 10/1997 | Bobo, II | 5,905,777 A | 5/1999 | Foladare et al. |
| 5,675,627 A | 10/1997 | Yaker | 5,907,805 A | 5/1999 | Chotai |
| 5,678,176 A | 10/1997 | Moon | 5,909,491 A | 6/1999 | Luo |
| 5,678,179 A | 10/1997 | Turcotte et al. | 5,913,032 A | 6/1999 | Schwartz et al. |
| 5,680,442 A | 10/1997 | Bartholomew et al. | 5,920,826 A | 7/1999 | Metso et al. |
| 5,684,859 A | 11/1997 | Chanroo et al. | 5,924,016 A | 7/1999 | Fuller et al. |
| 5,694,120 A | 12/1997 | Indekeu et al. | 5,928,325 A | 7/1999 | Shaughnessy et al. |
| 5,694,454 A | 12/1997 | Hill et al. | 5,930,250 A | 7/1999 | Klok et al. |
| 5,696,500 A | 12/1997 | Diem | 5,938,725 A | 8/1999 | Hara |
| 5,699,053 A | 12/1997 | Jonsson | 5,943,397 A | 8/1999 | Gabin et al. |
| 5,703,934 A | 12/1997 | Zicker et al. | 5,948,059 A | 9/1999 | Woo et al. |
| 5,706,211 A | 1/1998 | Beletic et al. | 5,951,638 A | 9/1999 | Hoss et al. |
| 5,710,816 A | 1/1998 | Stork et al. | 5,961,590 A | 10/1999 | Mendez et al. |
| 5,717,742 A | 2/1998 | Hyde-Thomson | 5,961,620 A | 10/1999 | Trent et al. |
| 5,722,071 A | 2/1998 | Berg et al. | 5,963,618 A | 10/1999 | Porter |
| 5,724,410 A | 3/1998 | Parvulescu et al. | 5,966,652 A | 10/1999 | Coad et al. |
| 5,726,643 A | 3/1998 | Tani | 5,974,447 A | 10/1999 | Cannon et al. |
| 5,737,394 A | 4/1998 | Anderson et al. | 5,974,449 A | 10/1999 | Chang et al. |
| 5,737,395 A | 4/1998 | Irribarren | 5,978,837 A | 11/1999 | Foladare et al. |
| 5,737,688 A | 4/1998 | Sakai et al. | 5,988,857 A | 11/1999 | Ozawa et al. |
| 5,740,230 A | 4/1998 | Vaudreuil | 5,991,615 A | 11/1999 | Coppinger et al. |
| 5,742,668 A | 4/1998 | Pepe et al. | 5,995,597 A | 11/1999 | Woltz et al. |
| 5,745,689 A | 4/1998 | Yeager et al. | 6,009,173 A | 12/1999 | Summer |
| 5,751,793 A | 5/1998 | Davies et al. | 6,014,559 A | 1/2000 | Amin |
| 5,751,814 A | 5/1998 | Kafri | 6,018,654 A | 1/2000 | Valentine et al. |
| 5,752,191 A | 5/1998 | Fuller et al. | 6,018,657 A | 1/2000 | Kennedy et al. |
| 5,761,622 A | 6/1998 | Priest | 6,021,114 A | 2/2000 | Shaffer et al. |
| 5,768,381 A | 6/1998 | Hawthorne | 6,021,190 A | 2/2000 | Fuller et al. |
| 5,774,803 A | 6/1998 | Kariya | 6,021,433 A | 2/2000 | Payne et al. |
| 5,778,315 A | 7/1998 | Proietti | 6,026,153 A | 2/2000 | Fuller et al. |
| 5,781,857 A | 7/1998 | Hwang et al. | 6,026,292 A | 2/2000 | Coppinger et al. |

| | | | |
|---|---|---|---|
| 6,029,065 A | 2/2000 | Shah | |
| 6,029,171 A | 2/2000 | Smiga et al. | |
| 6,032,039 A | 2/2000 | Kaplan | |
| 6,047,053 A | 4/2000 | Miner et al. | |
| 6,047,327 A | 4/2000 | Tso et al. | |
| 6,052,595 A | 4/2000 | Schellinger et al. | |
| 6,058,304 A | 5/2000 | Callaghan et al. | |
| 6,060,997 A | 5/2000 | Taubenheim et al. | |
| 6,064,342 A | 5/2000 | Sandhu et al. | |
| 6,064,879 A | 5/2000 | Fujiwara et al. | |
| 6,081,703 A | 6/2000 | Hallqvist | |
| 6,087,956 A | 7/2000 | Helferich | |
| 6,088,127 A | 7/2000 | Pieterse | |
| 6,088,717 A | 7/2000 | Reed et al. | |
| 6,091,957 A | 7/2000 | Larkins et al. | |
| 6,094,574 A | 7/2000 | Vance et al. | |
| 6,097,941 A | 8/2000 | Helferich | |
| 6,115,248 A | 9/2000 | Canova et al. | |
| 6,119,167 A | 9/2000 | Boyle et al. | |
| 6,122,484 A | 9/2000 | Fuller et al. | |
| 6,125,281 A | 9/2000 | Wells et al. | |
| 6,128,490 A | 10/2000 | Shaheen et al. | |
| 6,134,325 A | 10/2000 | Vanstone et al. | |
| 6,134,432 A | 10/2000 | Holmes et al. | |
| 6,138,158 A | 10/2000 | Boyle et al. | |
| 6,144,313 A | 11/2000 | Nakano | |
| 6,144,671 A | 11/2000 | Perinpanathan et al. | |
| 6,145,079 A | 11/2000 | Mitty | |
| 6,147,314 A | 11/2000 | Han et al. | |
| 6,151,443 A | 11/2000 | Gable et al. | |
| 6,151,491 A | 11/2000 | Farris et al. | |
| 6,151,507 A | 11/2000 | Laiho | |
| 6,169,883 B1 | 1/2001 | Vimpari et al. | |
| 6,169,911 B1 | 1/2001 | Wagner et al. | |
| 6,175,859 B1 | 1/2001 | Mohler | |
| 6,178,331 B1 | 1/2001 | Holmes et al. | |
| 6,185,423 B1 | 2/2001 | Brown et al. | |
| 6,195,564 B1 | 2/2001 | Rydbeck et al. | |
| 6,205,330 B1 | 3/2001 | Winbladh | |
| 6,208,839 B1 | 3/2001 | Davani | |
| 6,212,550 B1 | 4/2001 | Segur | |
| 6,215,858 B1 | 4/2001 | Bartholomew et al. | |
| 6,216,165 B1 | 4/2001 | Woltz et al. | |
| 6,219,694 B1 | 4/2001 | Lazaridis et al. | |
| 6,222,857 B1 | 4/2001 | Kammer et al. | |
| 6,230,133 B1 | 5/2001 | Bennett, III et al. | |
| 6,230,188 B1 | 5/2001 | Marcus | |
| 6,233,318 B1 | 5/2001 | Picard et al. | |
| 6,233,430 B1 | 5/2001 | Helferich | |
| 6,236,804 B1 | 5/2001 | Tozaki et al. | |
| 6,246,871 B1 | 6/2001 | Ala-Laurila | |
| 6,252,588 B1 | 6/2001 | Dawson | |
| 6,253,061 B1 | 6/2001 | Helferich | |
| 6,259,892 B1 | 7/2001 | Helferich | |
| 6,272,532 B1 | 8/2001 | Feinleib | |
| 6,278,862 B1 | 8/2001 | Henderson | |
| 6,282,435 B1 | 8/2001 | Wagner et al. | |
| 6,285,745 B1 | 9/2001 | Bartholomew et al. | |
| 6,285,777 B2 | 9/2001 | Kanevsky et al. | |
| 6,288,715 B1 | 9/2001 | Bain et al. | |
| 6,292,668 B1 | 9/2001 | Alanara et al. | |
| 6,298,231 B1 | 10/2001 | Heinz | |
| 6,301,471 B1 | 10/2001 | Dahm et al. | |
| 6,301,513 B1 | 10/2001 | Divon et al. | |
| 6,317,085 B1 | 11/2001 | Sandhu et al. | |
| 6,317,594 B1 | 11/2001 | Gossman et al. | |
| 6,320,957 B1 | 11/2001 | Draganoff | |
| 6,321,094 B1 | 11/2001 | Hayashi et al. | |
| 6,321,267 B1 | 11/2001 | Donaldson | |
| 6,330,244 B1 | 12/2001 | Swartz et al. | |
| 6,330,308 B1 | 12/2001 | Cheston et al. | |
| 6,333,919 B2 | 12/2001 | Gaffney | |
| 6,333,973 B1 | 12/2001 | Smith et al. | |
| 6,343,219 B1 | 1/2002 | Wada | |
| 6,344,848 B1 | 2/2002 | Rowe et al. | |
| 6,351,523 B1 | 2/2002 | Detlef | |
| 6,356,939 B1 | 3/2002 | Dahl | |
| 6,361,523 B1 | 3/2002 | Bierman | |
| 6,363,082 B1 | 3/2002 | Kammer et al. | |
| RE37,618 E | 4/2002 | Helferich | |
| 6,370,389 B1 | 4/2002 | Isomursu et al. | |
| 6,381,650 B1 | 4/2002 | Peacock | |
| 6,388,877 B1 | 5/2002 | Canova, et al. | |
| 6,389,457 B2 | 5/2002 | Lazaridis et al. | |
| 6,389,572 B1 | 5/2002 | Garrabrant et al. | |
| 6,397,059 B1 | 5/2002 | Vance et al. | |
| 6,401,113 B2 | 6/2002 | Lazaridis et al. | |
| 6,411,827 B1 | 6/2002 | Minata | |
| 6,418,305 B1 | 7/2002 | Neustein | |
| 6,421,678 B2 | 7/2002 | Smiga et al. | |
| 6,424,841 B1 | 7/2002 | Gustafsson | |
| 6,425,087 B1 | 7/2002 | Osborn et al. | |
| 6,438,585 B2 | 8/2002 | Mousseau et al. | |
| 6,441,824 B2 | 8/2002 | Hertzfeld et al. | |
| 6,442,243 B1 | 8/2002 | Valco et al. | |
| 6,442,637 B1 | 8/2002 | Hawkins et al. | |
| 6,449,344 B1 | 9/2002 | Goldfinger | |
| 6,457,134 B1 | 9/2002 | Lemke et al. | |
| 6,459,360 B1 | 10/2002 | Helferich | |
| 6,462,646 B2 | 10/2002 | Helferich | |
| 6,463,463 B1 | 10/2002 | Godfrey et al. | |
| 6,463,464 B1 | 10/2002 | Lazaridis et al. | |
| 6,484,027 B1 | 11/2002 | Mauney et al. | |
| 6,501,834 B1 | 12/2002 | Milewski et al. | |
| 6,505,237 B2 | 1/2003 | Beyda et al. | |
| 6,510,453 B1 | 1/2003 | Apfel et al. | |
| 6,516,202 B1 | 2/2003 | Hawkins et al. | |
| 6,522,879 B2 | 2/2003 | Myer et al. | |
| 6,523,124 B1 | 2/2003 | Lunsford et al. | |
| 6,539,476 B1 | 3/2003 | Marianetti et al. | |
| 6,546,083 B1 | 4/2003 | Chaves et al. | |
| 6,564,249 B2 | 5/2003 | Shiigi | |
| 6,567,179 B1 | 5/2003 | Sato et al. | |
| 6,580,784 B2 | 6/2003 | Rodriguez et al. | |
| 6,580,787 B1 | 6/2003 | Akhteruzzaman et al. | |
| 6,587,681 B1 | 7/2003 | Sawai | |
| 6,587,693 B1 | 7/2003 | Lumme et al. | |
| 6,590,588 B2 | 7/2003 | Lincke et al. | |
| 6,597,688 B2 | 7/2003 | Narasimhan et al. | |
| 6,597,903 B1 | 7/2003 | Dahm et al. | |
| 6,611,254 B1 | 8/2003 | Griffin et al. | |
| 6,622,147 B1 | 9/2003 | Smiga et al. | |
| 6,625,142 B1 | 9/2003 | Joffe et al. | |
| 6,625,642 B1 | 9/2003 | Naylor et al. | |
| 6,636,522 B1 | 10/2003 | Perinpanathan et al. | |
| 6,636,733 B1 | 10/2003 | Helferich | |
| 6,658,409 B1 | 12/2003 | Nomura et al. | |
| 6,662,195 B1 | 12/2003 | Langseth et al. | |
| 6,665,547 B1 | 12/2003 | Ehara | |
| 6,665,803 B2 | 12/2003 | Lunsford et al. | |
| 6,671,715 B1 | 12/2003 | Langseth et al. | |
| 6,687,839 B1 | 2/2004 | Tate et al. | |
| 6,694,316 B1 | 2/2004 | Langseth et al. | |
| 6,701,378 B1 | 3/2004 | Gilhuly et al. | |
| 6,728,530 B1 | 4/2004 | Heinonen et al. | |
| 6,741,980 B1 | 5/2004 | Langseth et al. | |
| 6,744,528 B2 | 6/2004 | Picoult et al. | |
| 6,744,874 B2 | 6/2004 | Wu | |
| 6,751,453 B2 | 6/2004 | Schemers et al. | |
| 6,760,423 B1 | 7/2004 | Todd | |
| 6,766,490 B1 | 7/2004 | Garrabrant et al. | |
| 6,771,949 B1 | 8/2004 | Corliss | |
| 6,775,264 B1 | 8/2004 | Kurganov | |
| 6,775,689 B1 | 8/2004 | Raghunandan | |
| 6,779,019 B1 | 8/2004 | Mousseau et al. | |
| 6,779,022 B1 | 8/2004 | Horstmann et al. | |

| | | | | | | |
|---|---|---|---|---|---|---|
| 6,788,767 | B2 | 9/2004 | Lambke | 7,403,793 B2 | 7/2008 | Mauney et al. |
| 6,792,112 | B1 | 9/2004 | Campbell et al. | 7,433,461 B1 | 10/2008 | Bauer |
| 6,792,544 | B2 | 9/2004 | Hashem et al. | 2001/0005857 A1 | 6/2001 | Lazaridis et al. |
| 6,807,277 | B1 | 10/2004 | Doonan et al. | 2001/0005860 A1 | 6/2001 | Lazaridis et al. |
| 6,813,489 | B1 | 11/2004 | Wu et al. | 2001/0005861 A1 | 6/2001 | Mousseau et al. |
| 6,823,225 | B1 | 11/2004 | Sass | 2001/0013071 A1 | 8/2001 | Lazaridis et al. |
| 6,826,407 | B1 | 11/2004 | Helferich | 2001/0048737 A1 | 12/2001 | Goldberg et al. |
| 6,832,130 | B2 | 12/2004 | Pintsov et al. | 2001/0054115 A1 | 12/2001 | Ferguson et al. |
| 6,868,498 | B1 | 3/2005 | Katsikas | 2002/0012323 A1 | 1/2002 | Petite |
| 6,869,016 | B2 | 3/2005 | Waxelbaum | 2002/0023131 A1 | 2/2002 | Wu et al. |
| 6,871,214 | B2 | 3/2005 | Parsons et al. | 2002/0029258 A1 | 3/2002 | Mousseau et al. |
| 6,880,079 | B2 | 4/2005 | Kefford et al. | 2002/0032658 A1 | 3/2002 | Oki et al. |
| 6,882,709 | B1 | 4/2005 | Sherlock et al. | 2002/0035687 A1 | 3/2002 | Skantze |
| 6,886,096 | B2 | 4/2005 | Appenzeller et al. | 2002/0038298 A1 | 3/2002 | Kusakabe et al. |
| 6,892,074 | B2 | 5/2005 | Tarkiainen et al. | 2002/0039419 A1 | 4/2002 | Akimoto et al. |
| 6,912,285 | B2 | 6/2005 | Jevans | 2002/0049818 A1 | 4/2002 | Gilhuly et al. |
| 6,912,400 | B1 | 6/2005 | Olsson et al. | 2002/0052218 A1 | 5/2002 | Rhee |
| RE38,787 | E | 8/2005 | Sainton et al. | 2002/0065887 A1 | 5/2002 | Paik et al. |
| 6,938,065 | B2 | 8/2005 | Jain | 2002/0065895 A1 | 5/2002 | Zhang et al. |
| 6,941,349 | B2 | 9/2005 | Godfrey et al. | 2002/0087645 A1 | 7/2002 | Ertugrul et al. |
| 6,944,283 | B1 | 9/2005 | Klein | 2002/0091777 A1 | 7/2002 | Schwartz |
| 6,950,679 | B2 | 9/2005 | Sugiyama et al. | 2002/0091782 A1 | 7/2002 | Benninghoff |
| 6,952,599 | B2 | 10/2005 | Noda et al. | 2002/0101998 A1 | 8/2002 | Wong et al. |
| 6,980,792 | B2 | 12/2005 | Iivonen et al. | 2002/0107928 A1 | 8/2002 | Chalon |
| 6,983,138 | B1 | 1/2006 | Helferich | 2002/0120696 A1 | 8/2002 | Mousseau et al. |
| 6,990,587 | B2 | 1/2006 | Willins et al. | 2002/0120788 A1 | 8/2002 | Wang et al. |
| 7,003,308 | B1 | 2/2006 | Fuoss et al. | 2002/0128036 A1 | 9/2002 | Yach et al. |
| 7,006,459 | B2 | 2/2006 | Kokot et al. | 2002/0138735 A1 | 9/2002 | Felt et al. |
| 7,007,239 | B1 | 2/2006 | Hawkins et al. | 2002/0138759 A1 | 9/2002 | Dutta |
| 7,013,391 | B2 | 3/2006 | Herle et al. | 2002/0156691 A1 | 10/2002 | Hughes et al. |
| 7,017,181 | B2 | 3/2006 | Spies et al. | 2002/0178353 A1 | 11/2002 | Graham |
| 7,020,688 | B2 | 3/2006 | Sykes, Jr. | 2002/0181701 A1 | 12/2002 | Lee |
| 7,023,967 | B1 | 4/2006 | Andersson et al. | 2002/0194281 A1 | 12/2002 | McConnell et al. |
| 7,031,437 | B1 | 4/2006 | Parsons et al. | 2002/0194285 A1 | 12/2002 | Mousseau et al. |
| 7,054,905 | B1 | 5/2006 | Hanna et al. | 2003/0005066 A1 | 1/2003 | Lazaridis et al. |
| 7,058,390 | B2 | 6/2006 | Chikazawa | 2003/0009698 A1 | 1/2003 | Lindeman et al. |
| 7,062,536 | B2 | 6/2006 | Fellenstein et al. | 2003/0037261 A1 | 2/2003 | Meffert et al. |
| 7,065,189 | B2 | 6/2006 | Wakabayashi | 2003/0048905 A1 | 3/2003 | Gehring et al. |
| 7,068,993 | B2 | 6/2006 | Rai et al. | 2003/0050987 A1 | 3/2003 | Lazaridis et al. |
| 7,072,642 | B2 | 7/2006 | Yabe et al. | 2003/0055902 A1 | 3/2003 | Amir et al. |
| 7,076,528 | B2 | 7/2006 | Premutico | 2003/0061511 A1 | 3/2003 | Fischer |
| 7,079,006 | B1 | 7/2006 | Abe | 2003/0078058 A1 | 4/2003 | Vatanen et al. |
| 7,082,469 | B2 | 7/2006 | Gold et al. | 2003/0081621 A1 | 5/2003 | Godfrey et al. |
| 7,082,536 | B2 | 7/2006 | Filipi-Martin | 2003/0088633 A1 | 5/2003 | Chiu et al. |
| 7,088,990 | B1 | 8/2006 | Isomursu et al. | 2003/0097361 A1 | 5/2003 | Huang et al. |
| 7,092,743 | B2 | 8/2006 | Vegh | 2003/0115448 A1 | 6/2003 | Bouchard |
| 7,100,048 | B1 | 8/2006 | Czajkowski et al. | 2003/0120733 A1 | 6/2003 | Forman |
| 7,107,246 | B2 | 9/2006 | Wang | 2003/0126216 A1 | 7/2003 | Avila et al. |
| 7,113,601 | B2 | 9/2006 | Ananda | 2003/0126220 A1 | 7/2003 | Wanless |
| 7,113,803 | B2 | 9/2006 | Dehlin | 2003/0142364 A1 | 7/2003 | Goldstone |
| 7,113,979 | B1 | 9/2006 | Smith et al. | 2003/0182575 A1 | 9/2003 | Korfanta |
| 7,116,762 | B2 | 10/2006 | Bennett, III et al. | 2003/0187938 A1 | 10/2003 | Mousseau et al. |
| 7,116,997 | B2 | 10/2006 | Byers et al. | 2003/0191808 A1 | 10/2003 | Adler et al. |
| 7,133,687 | B1 | 11/2006 | El-Fishawy et al. | 2003/0194990 A1 | 10/2003 | Helferich |
| 7,146,009 | B2 | 12/2006 | Andivahis et al. | 2003/0204568 A1 | 10/2003 | Bhargava et al. |
| 7,149,537 | B1 | 12/2006 | Kupsh et al. | 2003/0220979 A1 | 11/2003 | Hejl |
| 7,149,893 | B1 | 12/2006 | Leonard et al. | 2003/0222765 A1 | 12/2003 | Curbow et al. |
| 7,155,241 | B2 | 12/2006 | Helferich | 2003/0235307 A1 | 12/2003 | Miyamoto |
| 7,218,919 | B2 | 5/2007 | Vaananen | 2003/0235308 A1 | 12/2003 | Boynton et al. |
| 7,289,797 | B2 | 5/2007 | Kato | 2003/0237082 A1 | 12/2003 | Thurlow |
| 7,233,655 | B2 | 6/2007 | Gailey et al. | 2004/0019780 A1 | 1/2004 | Waugh et al. |
| 7,239,338 | B2 | 7/2007 | Krisbergh et al. | 2004/0021889 A1 | 2/2004 | McAfee et al. |
| 7,251,314 | B2 | 7/2007 | Huang | 2004/0024824 A1 | 2/2004 | Ferguson et al. |
| 7,254,384 | B2 | 8/2007 | Gailey et al. | 2004/0030906 A1 | 2/2004 | Marmigere et al. |
| 7,277,692 | B1 | 10/2007 | Jones et al. | 2004/0052340 A1 | 3/2004 | Joffe et al. |
| 7,277,716 | B2 | 10/2007 | Helferich | 2004/0059598 A1 | 3/2004 | Wellons et al. |
| 7,280,838 | B2 | 10/2007 | Helferich | 2004/0059914 A1 | 3/2004 | Karaoguz |
| 7,286,817 | B2 | 10/2007 | Provost | 2004/0060056 A1 | 3/2004 | Wellons et al. |
| 7,299,036 | B2 | 11/2007 | Sanding et al. | 2004/0073619 A1 | 4/2004 | Gilhuly et al. |
| 7,299,046 | B1 | 11/2007 | Ozugur et al. | 2004/0078488 A1 | 4/2004 | Patrick |
| 7,317,929 | B1 | 1/2008 | El-Fishawy et al. | 2004/0083271 A1 | 4/2004 | Tosey |
| 7,333,817 | B2 | 2/2008 | Tsuchiyama | 2004/0083365 A1 | 4/2004 | Renier et al. |
| 7,353,018 | B2 | 4/2008 | Mauney et al. | 2004/0111478 A1 | 6/2004 | Gross et al. |

| | | |
|---|---|---|
| 2004/0111480 A1 | 6/2004 | Yue |
| 2004/0116073 A1 | 6/2004 | Mauney et al. |
| 2004/0116119 A1 | 6/2004 | Lewis et al. |
| 2004/0122847 A1 | 6/2004 | Rodgers |
| 2004/0122905 A1 | 6/2004 | Smith et al. |
| 2004/0137884 A1 | 7/2004 | Engstrom et al. |
| 2004/0137955 A1 | 7/2004 | Engstrom et al. |
| 2004/0165727 A1 | 8/2004 | Moreh et al. |
| 2004/0185877 A1 | 9/2004 | Asthana et al. |
| 2004/0194116 A1 | 9/2004 | McKee et al. |
| 2004/0196978 A1 | 10/2004 | Godfrey et al. |
| 2004/0198348 A1 | 10/2004 | Gresham et al. |
| 2004/0199669 A1 | 10/2004 | Riggs et al. |
| 2004/0202327 A1 | 10/2004 | Little et al. |
| 2004/0203642 A1 | 10/2004 | Zatloukal et al. |
| 2004/0205106 A1 | 10/2004 | Adler et al. |
| 2004/0205248 A1 | 10/2004 | Little et al. |
| 2004/0205330 A1 | 10/2004 | Godfrey et al. |
| 2004/0208296 A1 | 10/2004 | Aboujaoude et al. |
| 2004/0212639 A1 | 10/2004 | Smoot et al. |
| 2004/0221014 A1 | 11/2004 | Tomkow |
| 2004/0221048 A1 | 11/2004 | Ogier |
| 2004/0230657 A1 | 11/2004 | Tomkow |
| 2004/0243677 A1 | 12/2004 | Curbow et al. |
| 2004/0243844 A1 | 12/2004 | Adkins |
| 2004/0243847 A1 | 12/2004 | Way |
| 2004/0249768 A1 | 12/2004 | Kontio et al. |
| 2004/0249895 A1 | 12/2004 | Way |
| 2004/0249899 A1 | 12/2004 | Shiigi |
| 2004/0252727 A1 | 12/2004 | Mousseau et al. |
| 2004/0266441 A1 | 12/2004 | Sinha et al. |
| 2005/0003809 A1 | 1/2005 | Kato |
| 2005/0009502 A1 | 1/2005 | Little et al. |
| 2005/0015455 A1 | 1/2005 | Liu |
| 2005/0019634 A1 | 1/2005 | Legg |
| 2005/0025172 A1 | 2/2005 | Frankel |
| 2005/0025291 A1 | 2/2005 | Peled et al. |
| 2005/0025297 A1 | 2/2005 | Finnigan |
| 2005/0038863 A1 | 2/2005 | Onyon et al. |
| 2005/0044160 A1 | 2/2005 | McElligott |
| 2005/0055413 A1 | 3/2005 | Keohane et al. |
| 2005/0058124 A1 | 3/2005 | Helferich |
| 2005/0058260 A1 | 3/2005 | Lasensky et al. |
| 2005/0060720 A1 | 3/2005 | Mayer |
| 2005/0076109 A1 | 4/2005 | Mathew et al. |
| 2005/0091329 A1 | 4/2005 | Friskel |
| 2005/0099654 A1 | 5/2005 | Chen |
| 2005/0099998 A1 | 5/2005 | Semper |
| 2005/0102381 A1 | 5/2005 | Jiang et al. |
| 2005/0108336 A1 | 5/2005 | Naick et al. |
| 2005/0108359 A1 | 5/2005 | Hyder et al. |
| 2005/0114652 A1 | 5/2005 | Swedor et al. |
| 2005/0130361 A1 | 6/2005 | Maguire et al. |
| 2005/0132010 A1 | 6/2005 | Muller |
| 2005/0135681 A1 | 6/2005 | Schirmer |
| 2005/0137009 A1 | 6/2005 | Vetelainen |
| 2005/0138353 A1 | 6/2005 | Spies |
| 2005/0141718 A1 | 6/2005 | Yu et al. |
| 2005/0148356 A1 | 7/2005 | Ferguson et al. |
| 2005/0159107 A1 | 7/2005 | Mauney et al. |
| 2005/0163320 A1 | 7/2005 | Brown et al. |
| 2005/0165740 A1 | 7/2005 | Kerr et al. |
| 2005/0176451 A1 | 8/2005 | Helferich |
| 2005/0180576 A1 | 8/2005 | Jevans |
| 2005/0188024 A1 | 8/2005 | Singer |
| 2005/0188045 A1 | 8/2005 | Katsikas |
| 2005/0198143 A1 | 9/2005 | Moody et al. |
| 2005/0198170 A1 | 9/2005 | LeMay et al. |
| 2005/0198506 A1 | 9/2005 | Qi et al. |
| 2005/0210064 A1 | 9/2005 | Caldini et al. |
| 2005/0210106 A1 | 9/2005 | Cunningham |
| 2005/0210246 A1 | 9/2005 | Faure |
| 2005/0210394 A1 | 9/2005 | Crandall et al. |
| 2005/0216587 A1 | 9/2005 | John |
| 2005/0216735 A1 | 9/2005 | Huang |
| 2005/0229258 A1 | 10/2005 | Pigin |
| 2005/0251558 A1 | 11/2005 | Zaki |
| 2005/0257057 A1 | 11/2005 | Ivanov et al. |
| 2005/0265551 A1 | 12/2005 | Hara |
| 2005/0282525 A1 | 12/2005 | Adams et al. |
| 2006/0013368 A1 | 1/2006 | LaBaw |
| 2006/0019638 A1 | 1/2006 | Chiu et al. |
| 2006/0019639 A1 | 1/2006 | Adams et al. |
| 2006/0020667 A1 | 1/2006 | Wang et al. |
| 2006/0021038 A1 | 1/2006 | Brown et al. |
| 2006/0021066 A1 | 1/2006 | Clayton et al. |
| 2006/0026246 A1 | 2/2006 | Fukuhara et al. |
| 2006/0029191 A1 | 2/2006 | Miller et al. |
| 2006/0041505 A1 | 2/2006 | Enyart |
| 2006/0041625 A1 | 2/2006 | Chen et al. |
| 2006/0046720 A1 | 3/2006 | Toropainen et al. |
| 2006/0046757 A1 | 3/2006 | Hoover et al. |
| 2006/0047766 A1 | 3/2006 | Spadea |
| 2006/0053202 A1 | 3/2006 | Foo et al. |
| 2006/0068768 A1 | 3/2006 | Sanding et al. |
| 2006/0069737 A1 | 3/2006 | Gilhuly et al. |
| 2006/0072761 A1 | 4/2006 | Johnson et al. |
| 2006/0074706 A1 | 4/2006 | Gilham |
| 2006/0075027 A1 | 4/2006 | Zager et al. |
| 2006/0080384 A1 | 4/2006 | Robinson et al. |
| 2006/0090065 A1 | 4/2006 | Bush et al. |
| 2006/0095510 A1 | 5/2006 | Rouse et al. |
| 2006/0101119 A1 | 5/2006 | Qureshi et al. |
| 2006/0133585 A1 | 6/2006 | Daigle et al. |
| 2006/0135128 A1 | 6/2006 | Skoog |
| 2006/0155698 A1 | 7/2006 | Vayssiere |
| 2006/0155812 A1 | 7/2006 | Looman |
| 2006/0168065 A1 | 7/2006 | Martin |
| 2006/0168072 A1 | 7/2006 | Park |
| 2006/0177015 A1 | 8/2006 | Skakkebaek et al. |
| 2006/0182124 A1 | 8/2006 | Cole et al. |
| 2006/0187897 A1 | 8/2006 | Dabbs et al. |
| 2006/0190533 A1 | 8/2006 | Shannon et al. |
| 2006/0194572 A1 | 8/2006 | Fresonke et al. |
| 2006/0200528 A1 | 9/2006 | Pathiyal |
| 2006/0217112 A1 | 9/2006 | Mo |
| 2006/0218224 A1 | 9/2006 | Agrawal et al. |
| 2006/0218244 A1 | 9/2006 | Rasmussen et al. |
| 2006/0221916 A1 | 10/2006 | Taylor et al. |
| 2006/0224893 A1 | 10/2006 | Sales et al. |
| 2006/0230266 A1 | 10/2006 | Maes |
| 2006/0233370 A1 | 10/2006 | Jung et al. |
| 2006/0234680 A1 | 10/2006 | Doulton |
| 2006/0239424 A1 | 10/2006 | Walter |
| 2006/0240868 A1 | 10/2006 | Kaplan et al. |
| 2006/0247962 A1 | 11/2006 | Harvey et al. |
| 2006/0248148 A1 | 11/2006 | Timmins et al. |
| 2006/0259558 A1 | 11/2006 | Yen |
| 2006/0265660 A1 | 11/2006 | Hullot et al. |
| 2006/0270461 A1 | 11/2006 | Won et al. |
| 2006/0285533 A1 | 12/2006 | Divine et al. |
| 2006/0286990 A1 | 12/2006 | Juan et al. |
| 2007/0042747 A1 | 2/2007 | Sun |
| 2007/0117541 A1 | 5/2007 | Helferich |
| 2007/0162454 A1 | 7/2007 | D'Albora et al. |
| 2007/0265838 A1 | 11/2007 | Chopra et al. |
| 2008/0037582 A1 | 2/2008 | Wang |
| 2008/0039052 A1 | 2/2008 | Knowles |
| 2009/0191848 A1 | 7/2009 | Helferich |

FOREIGN PATENT DOCUMENTS

| | | |
|---|---|---|
| EP | 0 695 071 | 1/1996 |
| EP | 777394 | 6/1997 |
| EP | 831664 | 9/1997 |
| EP | 0 505 489 | 11/1997 |

| | | |
|---|---|---|
| EP | 0 624 993 | 12/2003 |
| JP | 3-500955 | 2/1991 |
| JP | 03232325 | 10/1991 |
| JP | 6-70292 | 3/1994 |
| JP | 6-261121 | 9/1994 |
| JP | 6-276226 | 9/1994 |
| JP | 06245254 | 9/1994 |
| JP | 6-318899 | 11/1994 |
| JP | 7-503826 | 4/1995 |
| JP | 7-245773 | 9/1995 |
| JP | 8-97854 | 4/1996 |
| JP | 8-163637 | 6/1996 |
| JP | 8-228368 | 9/1996 |
| JP | 8-265245 | 10/1996 |
| JP | 08336182 | 12/1996 |
| JP | 9-146824 | 6/1997 |
| JP | 9-200250 | 7/1997 |
| JP | 2001-517891 | 10/2001 |
| JP | 2000-513362 | 9/2005 |
| KR | 00164369 | 9/1998 |
| WO | 89/05009 | 6/1989 |
| WO | 97/08906 | 3/1997 |
| WO | 9731488 | 8/1997 |
| WO | 97/32439 | 9/1997 |
| WO | 9858476 | 12/1998 |
| WO | 9965256 | 12/1999 |

OTHER PUBLICATIONS

Siewiorek, D.P., et al., "Computer Structures: Principles and Examples", McGraw-Hill Book Company, 1982, 21 pages.
"Active Channel Server Frequently Asked Questions (FAQ)", Microsoft Corporation, Q181161, 2006, 2 pages.
Engst, A.C., "TidBITS#349/Oct. 14, 1996," TidBITS Electronic Publishing, 1996, 10 pages.
Engst, A.C., "The Real TidBITS Channel", TidBITS Electronic Publishing, 1998, 4 pages.
"Introduction to Active Channel Technology", Microsoft Corporation, 2006, 5 pages.
Gillay, C.Z., "Subscriptions, Channels, and Active Desktop", TechNotes, Franklin, Beedle & Associates, Inc., 1999, pp. 1-6.
Winnick Cluts, N., et al., "A Preview of Active Channel and the Active Desktop for Internet Explorer 4.0", Microsoft Corporation, 1997, 13 pages.
"Active Channel Server Frequently Asked Questions (FAQ)", Microsoft Corporation, Q181161, 2006, 2 pages.
"Introduction to Active Channel Technology", Microsoft Corporation, 2006, 5 pages.
Anonymous, PatentAtlas, "Patent Cluster Tree Encompassing the Subject in Question: Sample" (date unknown).
Anonymous, usamobility.com, "ReFLEX Wireless Data Technology" (date unknown).
Engst, A.C., "The Real TidBITS Channel", TidBITS Electronic Publishing, 1998, 4 pages.
Engst, A.C., "TidBITS#349/Oct. 14, 1996," TidBITS Electronic Publishing, 1996, 10 pages.
Gillay, C.Z., "Subscriptions, Channels, and Active Desktop", TechNotes, Franklin, Beedle & Associates, Inc., 1999, pp. 1-6.
International Preliminary Examination Report dated Jul. 10, 2001 (7 pages) PCT/US00/08261 Jul. 1, 2001.
Khare, R., et al., "Scenarios for an Internet-Scale Event Notification Service (ISENS)", Internet-Draft, Aug. 13, 1998, 18 pages.
Plus Patent Linguistics Utility Search Results for U.S. Appl. No. 10/445,257, Searched Mar. 16, 2005.
Siewiorek, D.P., et al., "Computer Structures: Principles and Examples", McGraw-Hill Book Company, 1982, 21 pages.
Statutory Invention Regisration No. H610; Date: Mar. 7, 1989, Focarile et al.
Winnick Cluts, N., et al., "A Preview of Active Channel and the Active Desktop for Internet Explorer 4.0", Microsoft Corporation, 1997, 13 pages.
"New Wyndmail version 1.5 features another first for wireless industry," Busines Wire (Author Unknown) (Aug. 19, 1996).
"WyndMail wireless e-mail now provides "Message Header Preview" for Apple Powerbook and MessagePad," Business Wire (Author Unknown) (Jan. 9, 1997).
Anonymous, "Envoy Wireless Communicator User's Guide," Motorola, Inc. (1994).
Anonymous, "General Magic OS Targets US, Japan," Reed Business Information (1996).
Anonymous, "MessagePad 2000: New Newton Exceeds Expectation," TidBITS #379 (May 12, 1997).
Anonymous, "NETCOM and RadioMail form Strategic Alliance Enabling NETCOM Customers to Exchange Email, Send Faxes and Access Web Sites Wireless," Business Wire (Dec. 11, 2006).
Anonymous, "New Features of the Newton 2.0 Operating System," Apple Computer, Inc. (1995).
Anonymous, "New RadioMail Package Brings Maximum Affordability and Simplicity to Wireless Communications," AllBusiness (Feb. 27, 1996).
Anonymous, "Newton Apple MessagePad Handbook," Apple Computer, Inc. (1995).
Anonymous, "Newton Internet Enabler," (1997).
Anonymous, "Newton MessagePad (Original) Specs," EveryMac.com (1996).
Anonymous, "RadioMail Corporation Releases Wireless Internet Access Solution for CDPD Carriers," Business Wire (Oct. 7, 1996).
Anonymous, "Using E-Mail on Your Newton Device," Apple Computer, Inc. (1997).
Anonymous, "Sony Electronics Introduces Magic Link PIC-2000," Business Wire (Oct. 30, 1995).
Denise Shelton, "RadioMail can Find, Retrieve Web Pages," CNET News (Jun. 4, 1996).
Ira Brodsky, "Instant Gratification," Telephone Online (Jan. 15, 1999).
Mark Kellner, "Earthquake and RadioMail," The Washington Times (Jan. 24, 1994).
Mike Fine, "The AllPoints Wireless PC Card and RadioMail Service," www.palmtoppaer.com (Date Unknown).
Stuart Price, "Product Reviews: Eudora Pro for Newton 1.0," MacUser (Dec. 22, 1996).
Micheal M. Tao, et al., "Always on, Always Connected Mobile Computing," IEEE (1996).
Anonymous, "Newton Solutions Guide," Apple Computer, Inc. (1995).
Anonymous, "Newton Messaging Card Arrives," MacWeek (Sep. 1993).
Anonymous, "Allpen's Nethopper Lets Apple Newton Owners Surf Internet, Intranets," Tribune Business News (Jun. 1996).
Anonymous, § 3.2.9 ETSI GSM 3.40, "Digital Cellular Telecommunications System (Phase 2+) Technical Realisation of the Short Message Service Point-to-Point," v4.13.0, (May. 1996).
Anonymous, "Eudora Pro for Newton Users' Guide," Eudora. (Date Unknown).
"Notice of Grounds of Rejection," Japanese Patent App. No. 2008-302127, dated Jun. 30, 2009.
"Notice of Grounds of Rejection," Japanese Patent App. No. 2009-052859, dated Oct. 6, 2009.
"Notice of Grounds of Rejection," Japanese Patent App. No. 2009-052858, dated Oct. 6, 2009.
Anonymous, "Second Generation Personal Handy Phone System," pp. 117-119, dated Jun. 25, 1996.
Freed, Borenstein, RFC 2045, MIME format standards, Nov. 1996.
Anonymous, Wikipedia, "Personal Communications Service".
Anonymous, Wikipedia, "SMS".
"Claim Charts Applying 5,905,777 (Foladare et al.) to Selected Claims of Helferich U.S. Patent Nos. 7,499,716, 7,280,838, and 7,155,241" (Apr. 15, 2010).
"Final Rejection," Japanese Patent App. No. 2008-302127, dated Apr. 13, 2010.
"Final Rejection," Japanese Patent App. No. 2009-052858, dated Apr. 22, 2010.
Fuhrt, Design issues for interactive television systems, Computer Magazine, May, 1995.
Henriksen, Mobile Data Network System Description, Norwegian Telecommunications Administration Research Dept, Apr. 1986.

Crispin, Interactive Mail Access Protocol—Version 2, Request for Comments 1176, Networks Working Group, Aug. 1990.

Kesperson, vol. 1 Network architecture addressing and routing, Mobile Data.

Network Description, Teledirektoratets forskningsavdeling, Mar. 1989.

Kaspersen, vol. 2 Service and service elements, "Mobile Data Network Desctiption", Teledirektoratets forskningsavdeling, Apr. 1989.

Kaspersen, vol. 6 Requirements to the Base Station, "Mobile Data Network Desctiption", Teledirektoratets forskningsavdeling, Jul. 1989.

Kaspersen, vol. 7 Requirements to the Mobile Stations, "Mobile Data Network Desctiption", Teledirektoratets forskningsavdeling, Sep. 1989.

Kramer, Use of two-way wireless messaging for personal telephone management, University of Wisconsin Record, Jun. 1905.

Anonymous, re Nokia 9000i Communicator, Owner's Manual Issue 1.1, Undated.

Anonymous, Changes from Pine 3.96 to 4.00, Computing and Networking, University of Washington, Feb. 2001.

Anonymous, Active Paper's Presto!Mail to be bundled with Envoy 150 Wireless Communicator from Motorola, Business Wire, Apr. 1996.

Crispin, Internet Message Access Protocol Version 4, Request for Comments 2060, Network Working Group, Dec. 1996.

Rodriguez, Motorola provides NetWare access to paging networks, InfoWorld, May 1995.

Joseph, Rover: a toolkit for mobile information access, SIGOPS Dec. 1996, Jan. 1990.

Hardy, SkyTel is set to launch two-way-paging—Mtel unit is poised for big gains in wireless business, Wall Street Journal, Sep. 1995.

Anonymous, Motorola unveils next-generation Tango products at PCS '96; Tanto Lite guarantees message delivery and receipt, Business Wire, Sep. 1996.

Kasperen, vol. 3 Protocols and protocol hierarchy within the MDN, "Mobile Data Network Descpription", Teledirektoratets forskningsavdeling, May 1989.

Kasperen, vol. 4 Specificiation of DTL and DTP within the MDN, "Mobile Data Network Descpription", Teledirektoratets forskningsavdeling, Jun. 1989.

Kasperen, vol. 8 Specification of the MDN-MHS inter-working, "Mobile Data Network Descpription", Teledirektoratets forskningsavdeling, Aug. 1989.

Anonymous UP Browser Manual, Unwired Planet, Aug. 1996.

Anonymous, UP HDML Language Reference, Jul. 1996.

Anonymous, UP Up.Link Developer's Guide, Jul. 1996.

Verjinski, PHASE, a portable host access system environment, Unisys Defense Systems, Jan. 1990.

Kylanpaa, Nomadic access to information services by a GSM phone, Computer & Graphics, Jun. 1905.

Anonymous, Cost of Ownership Analysis Instructions, Unwired Planet, Jun. 2010.

Anonymous, The Mobile Intranet—wireless internet access with UP Link by Unwired Planet, Jun. 1905.

Butler, Post Office Protocol Version 2, Request for Comments 937, Network Working Group, Feb. 1985.

Taylor, Internetwork Mobility—the CDPD Approach, Jun. 1996.

Anonymous, Narrowband Sockets Specification Intel and Nokia, Sep. 1996.

deLespinasse, Rover Mosaic: E-mail communication for a full-function web browser, Master's Thesis, MIT, Jun. 1995.

Anonymous, Compiled Redacted Correspondence regarding Tso '327 Reference, 2010.

"Notice of Grounds of Rejection," Japanese Patent App. No. 2010-001327, dated Aug. 17, 2010 (including English Translation).

PAGING TRANSCEIVERS AND METHODS FOR SELECTIVELY RETRIEVING MESSAGES

This application is a continuation of U.S. patent application Ser. No. 11/050,775, filed Feb. 7, 2005, which is a divisional of U.S. patent application Ser. No. 09/688,321, filed on Oct. 13, 2000 (now U.S. Pat. No. 7,003,304), which is a divisional of U.S. patent application Ser. No. 08/934,143, filed on Sep. 19, 1997 (now U.S. Pat. No. 6,233,430). The contents of the above referenced applications are incorporated herein by this reference.

RELATED APPLICATIONS

Reference is made to the following related issued patents: U.S. Pat. Nos. 6,259,892; 6,233,430; 6,087,956; 6,253,061; 6,462,646; 6,696,921 and 6,459,360.

FIELD OF THE INVENTION

The present invention relates generally to paging transceivers and methods for selectively acting on messages and, more particularly, to paging transceivers and methods for selectively retrieving messages.

BACKGROUND OF THE INVENTION

In general, a paging receiver can be classified into one of four categories: an alert or tone only paging receiver, a numeric paging receiving, an alphanumeric paging receiver, or a voice paging receiver. One common characteristic of all of these paging receivers is that they monitor the air waves and notify the user when their particular address has been detected. For the alert or tone only paging receiver, the paging receiver would generate a tone or beep when its address is detected. The other paging receivers, upon detecting their address, would additionally store a message associated with the address signal and display or play it to the user. The message for a numeric paging receiver would be a set of numbers, typically the calling person's telephone number, and the message for an alphanumeric paging receiver would be a set of numbers and/or letters. The user of an alphanumeric paging receiver could therefore receive a message in the form of a telephone number with some descriptive text. For the voice paging receiver, the message that is stored is a voice message that the user can later play to hear the message.

A paging receiver is typically a rather small electronic device and, accordingly, has a limited amount of memory for storing messages that have been received from a base station in a paging system. Because of the relatively small size of the memory, the paging receiver can store only a limited number of messages. A user can delete messages from memory but will oftentimes desire to save a message, such as temporarily until the user makes a note of the message or until he or she is able to respond to the page. The messages that are saved in memory, however, reduce the space in memory that is available to receive new messages. This demand on space in memory is increasing as the size of the messages continue to grow and as users receive a greater number of messages. Although more memory can be added to accommodate more messages, the added cost and space needed for extra memory runs counter to the desires to keep the paging receiver small and inexpensive. A need therefore exists for a paging receiver which can display messages while efficiently using memory.

In addition to the demand on paging receiver memory, paging systems will be challenged as greater numbers of pages are being transmitted and as the size of the transmitted messages increases. Initially, when paging systems were only concerned with transmitting address signals of the paging receivers, the size of each transmission by the paging systems was relatively small. Paging receivers and paging systems, however, have undergone tremendous advances with paging systems now transmitting messages which can be hundreds of kilobytes or greater in size in addition to the address signals. Additionally, many paging receivers are actually paging transceivers which transmit acknowledgment signals back through the paging system. The capacity of the paging systems are therefore being challenged not only by messages of increasing sizes but also by reply signals transmitted from the paging transceivers to the paging system. The future of paging systems is therefore tied to the ability of the paging systems to control the number and size of the data transmissions and to provide additional features without sacrificing the quality of service to the user.

As discussed above, many paging transceivers are able to issue a reply or acknowledgment back to the base station in response to a received message. If the base station does not receive this reply or acknowledgment, then the base station assumes that the message has not been received and will repeatedly transmit the message until the reply or acknowledgment is received. Due to the high power levels at which the base station transmits its paging signals, the signals are usually easily received by all paging transceivers located within the coverage area of the base station antenna The paging transceivers, on the other hand, must operate at lower power levels and often cannot transmit signals at sufficiently high levels to reach the base station. For example, when a paging transceiver is located in a basement of a building, in a subway, or in an airplane, the paging transceiver may be unable to issue a reply that can reach the base station. As a result, the base station may continue to transmit a page to a paging transceiver and the paging transceiver will continue to receive the message but the base station cannot detect the reply being issued by the paging transceiver. This unnecessary transmission of duplicate messages and the ineffectual reply signals transmitted by the paging transceivers consume valuable resources of the paging system and of the paging transceiver.

For safety reasons, a user may at times have to turn off his or her paging transceiver. For instance, when the user is on an airplane, the transmissions from the paging transceiver can interfere with the instrumentation or communication within the cockpit of the plane. The paging transceiver therefore should not be operating within the plane or around other electronic equipment that are sensitive to interference from the signals transmitted by the paging transceiver. As another example, if the user is in an environment that contains electronic detonators for explosive materials, the signals transmitted by the paging transceiver could possibly trigger an explosion. The user therefore must turn his or her paging transceiver off to ensure that it does not transmit any reply or acknowledgment signals in response to a received page. Although it may be dangerous for the paging transceivers to issue a reply signal in these situations, the signals transmitted by the base station may at times be safely received by the paging transceiver. Since the paging transceiver automatically issues a reply in response to a received message, the paging transceiver must nonetheless be turned off so as to not pose a risk to the user. During these times that the paging transceiver must be turned off, the user unfortunately is unable to receive any page or message. A need therefore exists for a paging transceiver that can notify a user of a message without automatically generating a reply message or acknowledgment to the base station.

SUMMARY OF THE INVENTION

The present invention solves the problems described above with methods and systems for selective paging. A paging system notifies a paging transceiver that a message has been received but does not initially transmit the associated message. The user, upon being notified of the message, can then download the entire message at a time convenient to the user, which allows the user to download messages at less-expensive off-peak hours and allows the user to place the paging transceiver at a location where it can easily receive the message and reply to the message. Since the messages are not initially transmitted to the paging transceiver, the paging transceiver can receive and store a greater number of pages with minimal increase in the size of memory. Further, because entire messages are not automatically transmitted and since the user can position the paging transceiver to issue a sufficiently strong reply, traffic in the paging system can be controlled and actually reduced.

The system may transmit some identifying information about the page to the user without sending the entire message. For instance, the base station may identify the type of message, such as email, voice, or text, and also indicate the caller or other descriptive material about the message. The user can then determine the priority of the messages and whether he or she wants to retrieve the message, play the message, erase the message, store the message, forward, reply, or otherwise act on the message. The user is also given control over the messages stored remotely from the paging transceiver and can erase or store these messages from the paging transceiver. The paging transceiver may have a timer for allowing the user to program the paging transceiver to perform a desired function on a message at a particular time.

The information initially sent to the user may also indicate the location of the stored message. For instance, the system paging a particular paging transceiver to notify it that a page has been received need not be the system actually storing the content of the message. Instead, a plurality of systems may store the contents of messages with one or more of the systems paging the paging transceiver. The paging transceiver would be provided sufficient information on the system storing the message so that it can communicate with this system. The system paging the paging transceiver can therefore act as a clearinghouse for other messaging systems by notifying a user of all messages received regardless of their source or type.

Accordingly, it is an object of the present invention to provide pager transceivers and methods for paging that conserve memory in paging receivers It is another object of the present invention to provide pager transceivers and methods for paging that conserve valuable air time.

It is a further object of the present invention to provide pager transceivers and methods for paging that provide users with remote control over their messages.

It is yet another object of the present invention to provide pager transceivers and methods for paging that allow users to select when and how action should be taken on their messages.

It is yet a further object of the present invention to provide pager transceivers and methods for notifying users of received messages.

It is also an object of the present invention to provide pager transceivers and methods for providing control to users over message stored at remote locations.

It is still another object of the present invention to provide pager transceivers and methods that notify users of messages received from multiple sources.

BRIEF DESCRIPTION OF THE DRAWINGS

The accompanying drawings, which are incorporated in and form a part of the specification, illustrate preferred embodiments of the present invention and, together with the description, serve to explain the principles of the invention. In the drawings.

DETAILED DESCRIPTION

Figure 1:
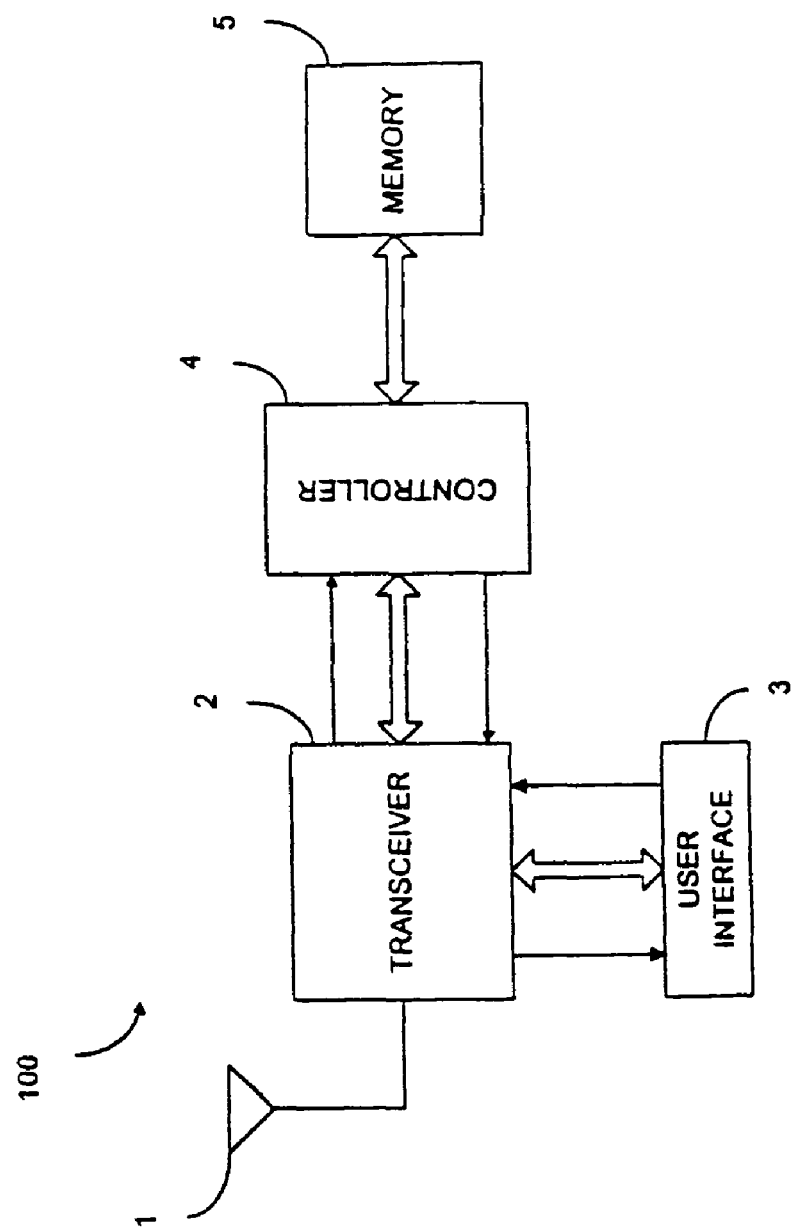
FIG. 1 is a block diagram of a paging transceiver according to a preferred embodiment of the invention.

Reference will now be made in detail to preferred embodiments of the invention, non-limiting examples of which are illustrated in the accompanying drawings. With reference to FIG. 1, a paging transceiver 100 according to a preferred embodiment of the invention comprises an antenna 1, a transceiver 2, a user interface 3, a controller 4, and a memory 5. The single antenna 1 is preferably used for both receiving and transmitting signals, although the paging transceiver 100 may comprise a separate antenna for transmitting signals and a separate antenna for receiving signals.

The transceiver 2 is connected to the antenna 1 and is for transmitting signals from the paging transceiver 100 and for receiving signals directed to the paging transceiver 100. The signals that may be transmitted to, or received from, the paging transceiver 100 include, but are not limited to, such signals as selective call signals, command data signals, signals corresponding to a message, and information data signals. The transceiver 2 may comprise a transceiver found in two way pagers or mobile radios and preferably comprises a transceiver commonly used in a portable mobile radiotelephone.

The transceiver 2 is connected to the user interface 3, which contains all necessary input and output devices. The user interface 3 includes a microphone, speaker, alert transducer, LED or LCD display, keypad, and necessary switches. The user interface 3 may also contain other types of input/output devices depending on the messaging application, such as a video display, camera, scanner, a printer, or a voice recognition device. The user interface 3 is not limited to these examples of user input/output devices but may comprise any input or output device which allows or assists communication between the user and the paging transceiver 100.

The transceiver 2 is connected to, and communicates with, the controller 4, which preferably comprises a digital signal processor (DSP) 4. The memory 5 is connected to the DSP 4 and is for storing messages or other types of information. The memory 5 may comprise static RAM, Dynamic RAM, Flash RAM, or any type of memory suitable for storing messages and allowing the retrieval of the messages. The amount of the memory 5 is preferably at least 4 MB for voice or text applications, although it may consist of a greater or lesser amount depending upon the specific message type application.

Figure 2:
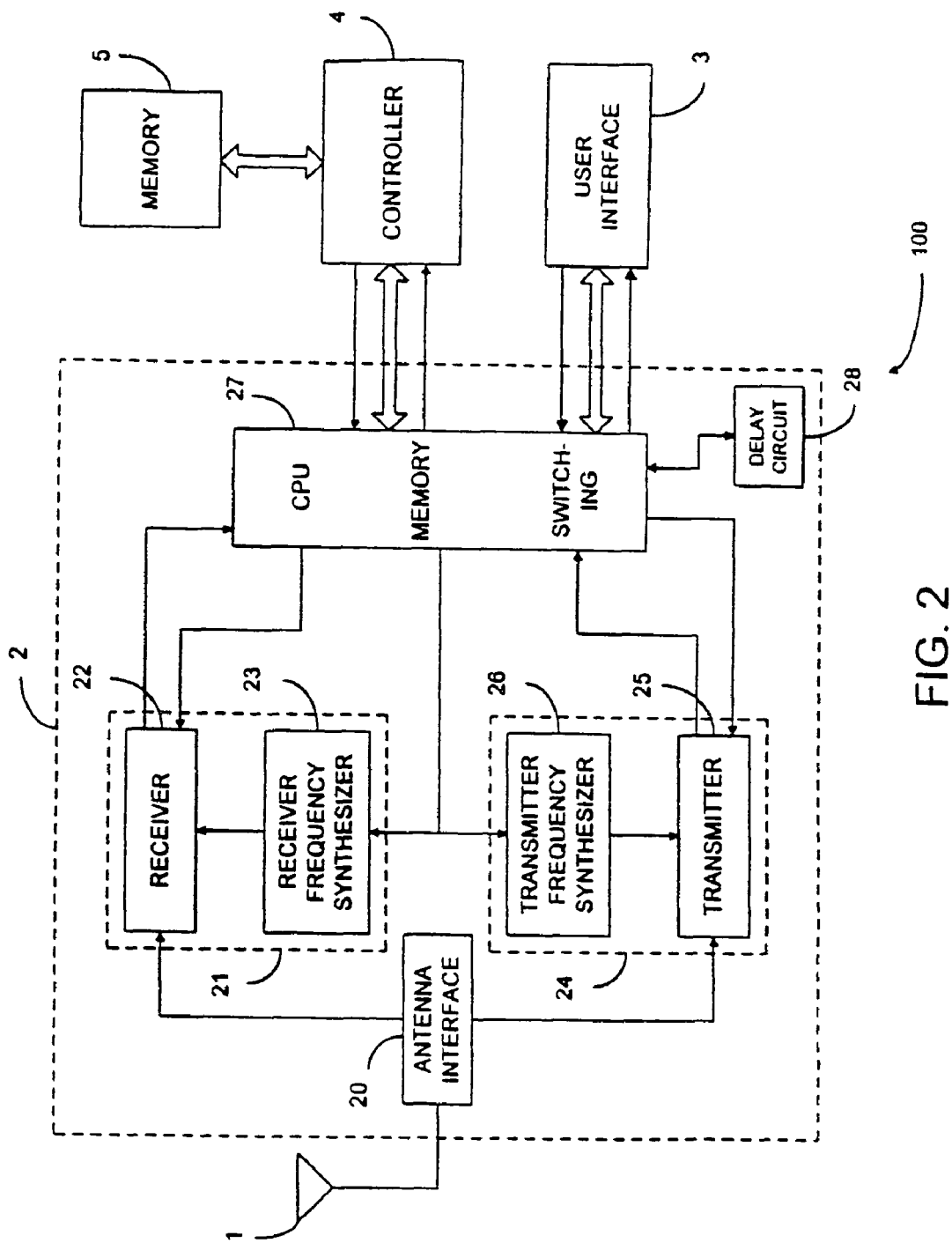
FIG. 2 is a more detailed block diagram of the transceiver in the paging transceiver of FIG. 1.

The transceiver 2, as shown in more detail in FIG. 2, includes an antenna interface 20 connected to the antenna 1 The antenna interface 20 directs signals received from antenna 1 to a receiver section 21 of the paging transceiver 100 and directs signals transmitted from a transmit section 24 to the antenna 1. The antenna interface 20 is preferably a duplexer, however an antenna switch or other device may be utilized to provide signal isolation between the receiver and transmitter sections 21 and 24. Alternatively, if paging transceiver 100 includes two antennas 1 with one for transmitting signals and the other for receiving signals, the transceiver 2 would not require any type of antenna interface 20.

The receive section 21 includes a receiver 22 and a receiver frequency synthesizer 23. The receiver 22 is connected to the antenna 1 through antenna interface 20 and receives the signals directed to the paging transceiver 100. The receiver frequency synthesizer 23, based on an input from a processor 27, selects the frequency at which the receiver 22 receives signals. The received signals are passed from the receiver 22 to the processor 27.

The transmit section 24 includes a transmitter 25 for receiving signals from the processor 27. The transmit section 24 also includes a transmitter frequency synthesizer 26 connected to the transmitter 25 which, based upon an input from the processor 27, selects the transmit frequency for the transmitter 25. The signals output by the transmitter 25 are supplied to the antenna interface 20 and then to the antenna 1.

The processor 27 comprises a central processing unit (CPU) having internal memory and switching capabilities. The CPU 27, for instance, comprises all necessary RAM and ROM memory, signal and data switching circuitry, signal processing circuitry, I-O Ports, and all standard program instructions and stored options commonly utilized in portable cellular telephones. The standard cellular telephone program instructions and CPU 27 may be obtained from a variety of suppliers. For instance, the instructions may be obtained from Wireless Link Inc. of Sunnyvale, Calif. and the CPU 27 from GEC Plessey Semiconductor, Inc. of Scotts Valley, Calif.

The DSP 4 includes necessary I-O and program memory and are commonly utilized in cellular telephones. Any suitable DSP may be used in the paging transceiver 100. Alternatively, the controller 4 may comprise another type of electronic device, such as a codec or digital-to-analog/analog-to-digital conversion circuit or other type of modulator-demodulator including memory interface circuitry coupled to message memory 5 for reading and writing of messages.

The transceiver 2 also preferably includes a delay circuit 28. The delay circuit 28 may comprise a timer which informs the processor 27 of when a period of time has expired. The timer, for instance, may expire at a certain time of day, week, or month, or may expire a fixed period of time after a triggering event, such as one hour after the event. The time at which the timer 28 expires is preferably programmable through the user interface 3 and through processor 27. Additionally, the timer 28 preferably comprises a plurality of timers for notifying the processor 27 of when a plurality of different time periods have expired. Rather than a timer, the delay circuit 28 may alternatively operate to delay the occurrence of an event until a certain condition is satisfied. This condition, for instance, may be the strength of received signals or the receipt of a specified signal. The purpose of the timer 28 will become apparent from the description below.

Figure 3:
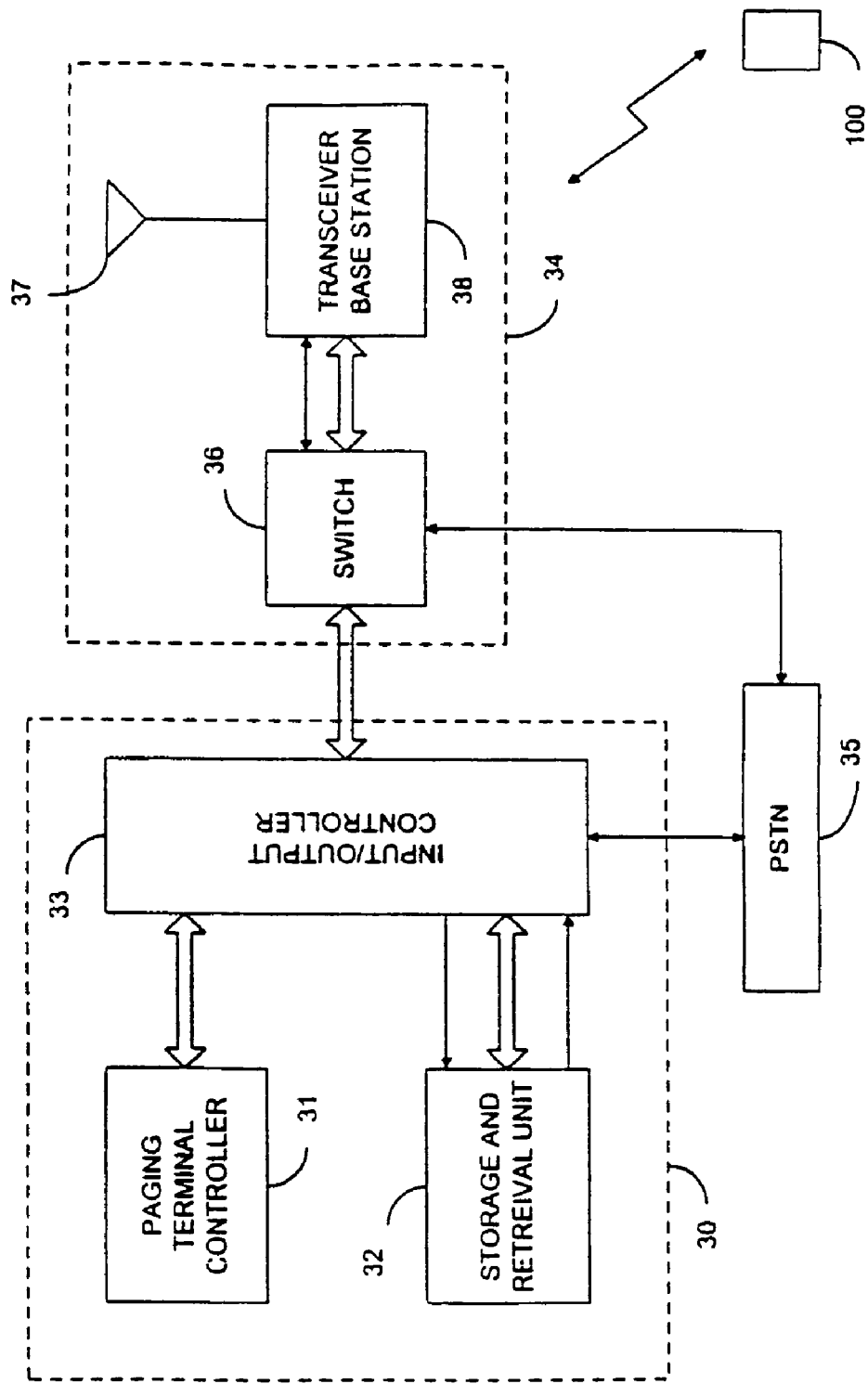
FIG. 3 is a block diagram of a communication system according to a preferred embodiment of the invention.

With reference to FIG. 3, a system 30 according to a preferred embodiment of the invention is interconnected to a base station 34, both of which are connected to the Public Switched Telephone Network (PSTN) or to other telephone company equipment 35. The system 30 comprises a paging terminal controller 31 which may comprise a controller circuit and associated memory having a database of subscriber listings and corresponding selective call address fields. The paging terminal controller 31 communicates with storage and retrieval unit 32 and correlates messages with subscriber listings. The storage and retrieval unit 32 may comprise a CPU or control circuit, message information and program memory, memory interface circuitry and a DSP with appropriate operational code for storage and retrieval of the desired messages. The input/output controller 33 contains all necessary input and output circuitry such as encoders and decoders, modems and required routing and control circuitry for communicating with the paging terminal controller 31, the storage and retrieval unit 32, the PSTN 35, and the base station 34.

Figure 4A:
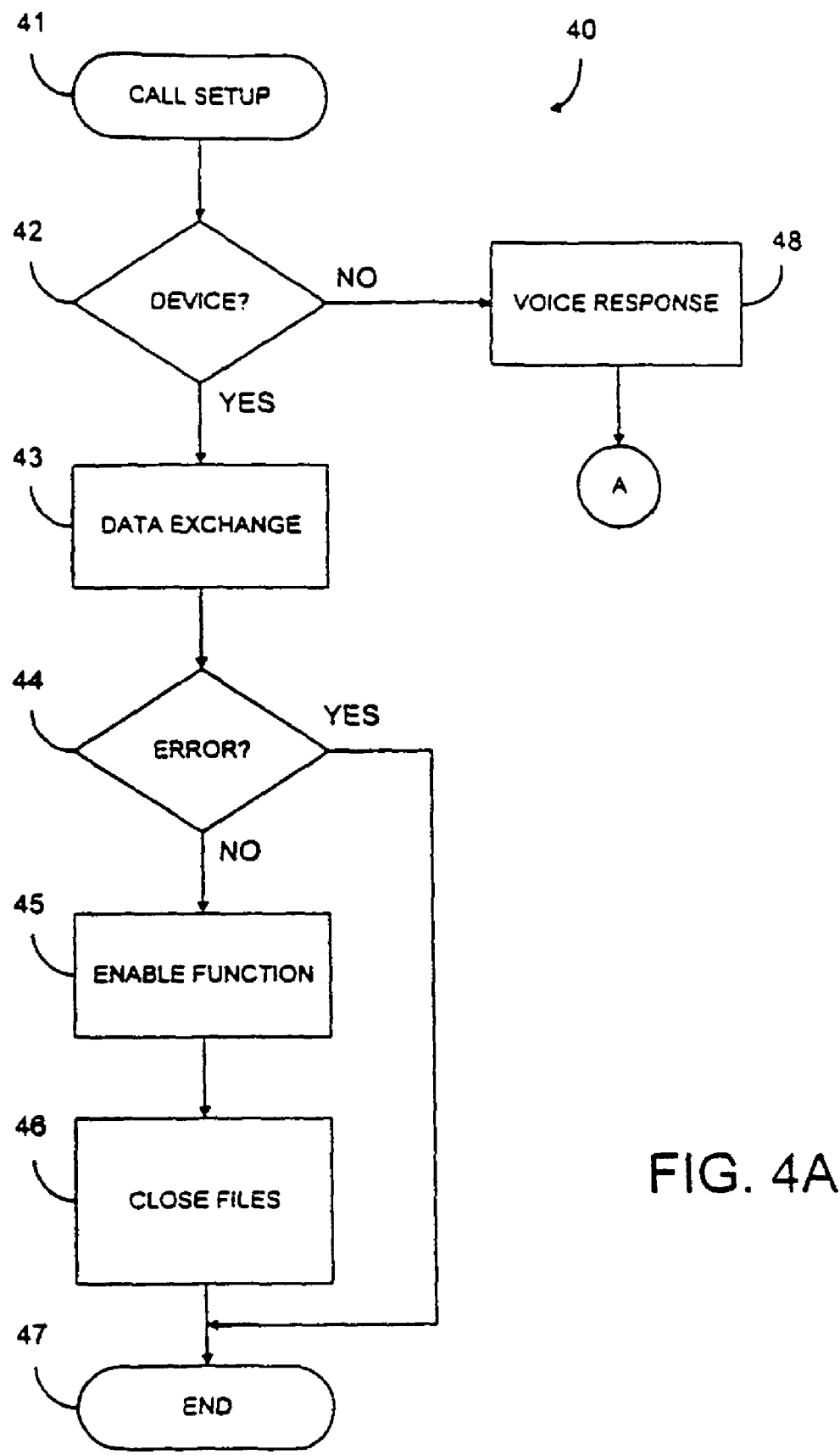
FIGS. 4A and 4B are flow charts depicting an exemplary set-up routine for establishing communications between the system of FIG. 3 and the transceiver of FIG. 1.

A call setup routine 40 for establishing communication between the system 30 and base station 34 will now be described with reference to FIGS. 4A and 4B. At step 41, a connection, such as a telephone connection, is routed through the PSTN 35 or in the case of paging transceiver 100 the switch 36, to the input/output controller 33. The input/output controller 33 determines at step 42 whether the connection is with an automated signaling device or with a person. If the connection is with a person, then at step 48 the storage and retrieval unit 32 is activated to produce one or more voice responses during the call in order to guide the person throughout the process.

If, at step 42, the input/output controller 33 determines that the call is from a device, such as a paging transceiver 100 or computer terminal, data is exchanged between the paging transceiver 100 and system 30 at step 43. The type of data that may be exchanged includes, but is not limited to, the following types of data: identification data, command data, and information data. The data supplied from the PSTN 35 may also be exchanged at step 43 with this data including data for identifying the caller and subscriber, such as, for example, Caller ID and DNIS (Dialed Number Identification Service). Additionally, the data may be extracted from the base station 34. For example, the location of the paging transceiver 100 may be determined from a home location registry (HLR) and the HLR data may be utilized by the system 30 in order to determine the location of the paging transceiver 100, as opposed to having the paging transceiver 100 supply the location information to system 30.

After data is exchanged at step 43, the system 30 determines at step 44 whether an error occurred during the transmission between the system 30 and paging transceiver 100. If an error did occur, then at step 47 the process ends and the paging transceiver 100 is informed of the error. The error is preferably presented to the user in the form of status information produced at the user interface 3, such as with an alert tone or visual display on the LED or LCD display. An error may include, but is not limited to, the following errors: "system busy," "wrong ID," or "bill over due." If no error is detected, as determined by the system 30 at step 44, a function is enabled and executed at step 45. The function, as will be described in greater detail below with reference to FIG. 8, may be selected by the user from a group of available functions. At step 46, housekeeping functions are performed both at the paging transceiver 100 and at the system 30 and the call is terminated at step 47.

Figure 4B:
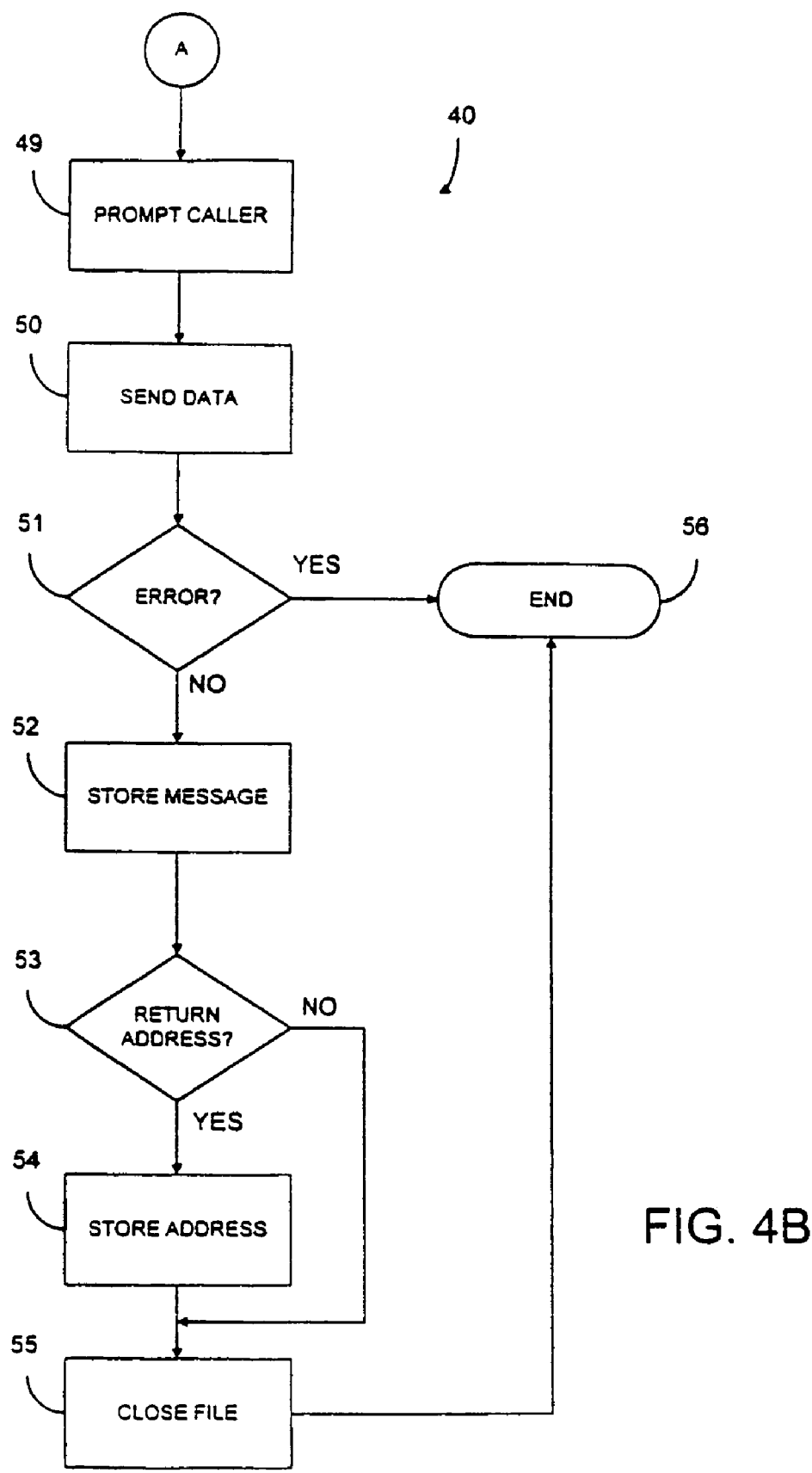

If the call is from a person as determined at step 42, then the caller is provided with a voice response at step 48 and, with reference to FIG. 4B, the caller is then verbally prompted at step 49 to enter information. At step 50, the caller sends data to the system 30, such as by pressing the telephone keypad to generate DTMF tones. The data that may be sent by the caller includes, but is not limited to, ID code, pass code, mail box number, and subscriber number. The system 30 may respond to voice commands from a caller by utilizing a readily available voice recognition system, such as those presently in use by the telephone company to except collect calls. At 51, the system 30 determines whether an error has occurred. If an error is detected, the caller may be given an opportunity to correct the error or, as shown, the process may end at step 56. If no error was detected by the system 30 at step 51, a message, such as a voice message, is recorded and stored in the storage and retrieval unit 32 at step 52. At step 53, the system 30 determines whether a return receipt or a reply message is requested. If a return receipt or reply message is requested, the return address is entered by the caller or optionally issued by the system 30 and is stored by the system 30 in the storage and retrieval unit 32 at step 54. The system 30, for instance, may detect the address signal of the incoming call and, by default, store this number as the return address. After the return address is stored at step 54 or if a return address is not requested, the stored message is cross referenced to selective call data corresponding to the intended paging transceiver 100 at step 55. Also at step 55, a flag is set in a transmission stack file at the paging terminal controller 31 for subsequently transmitting selective call signals representative of the selective call data to the targeted paging transceiver 100. Housekeeping is performed by the system 30 and the call ends at step 56.

The base station 34, as shown in FIG. 3, comprises a switch 36, a transceiver antenna 37, and a transceiver base station 38. In response to a received message, the system 30 passes control information to switch 36 for setting up a page call. The switch 36, for instance, may be a mobile telephone switching office (MTSO) for interfacing to the transceiver base station 38. In the send page mode, selective call signals having an address associated with the paging transceiver 100 are transmitted. The address may be an address code for a paging transceiver, a mobile telephone number (MIN) for a mobile radiotelephone, or type of identifying information for a communication device.

Command data and information data may also be communicated from the system 30 to the paging transceiver 100 through the base station 34. The command data and information data shall hereinafter be referred to as CI data, examples of which include the following: paging transceiver location, forward message, retrieve message, reply to message, paging transceiver ID, message identifiers, retrieval instructions, save message, erase message, message type, message length, time/date message received, system 30 ID, system 30 location, message address, message location, battery life, message identifier, format code, compression type, message age, message priority, alert codes, energy saving commands, memory status, program data, provisioning data, acknowledgment data and requests, function codes, sender name, current time, number of messages, mailbox number, phone number, return address, alpha numeric short messages, general command requests, group calls, and signal strength.

The address and command data and information may be transmitted over any suitable communication system. For instance, the data may be communicated over a paging system, a cellular system having short message service capabilities such as GSM-SMS, a Cellular Digital Packet Data (CDPD) system, Personal Communications Services, or any other type of mobile radiotelephone system or communication system. Furthermore, the paging transceiver 100 preferably is able to communicate over more than one system, such as with both a paging network and a mobile radiotelephone network.

Figure 5:
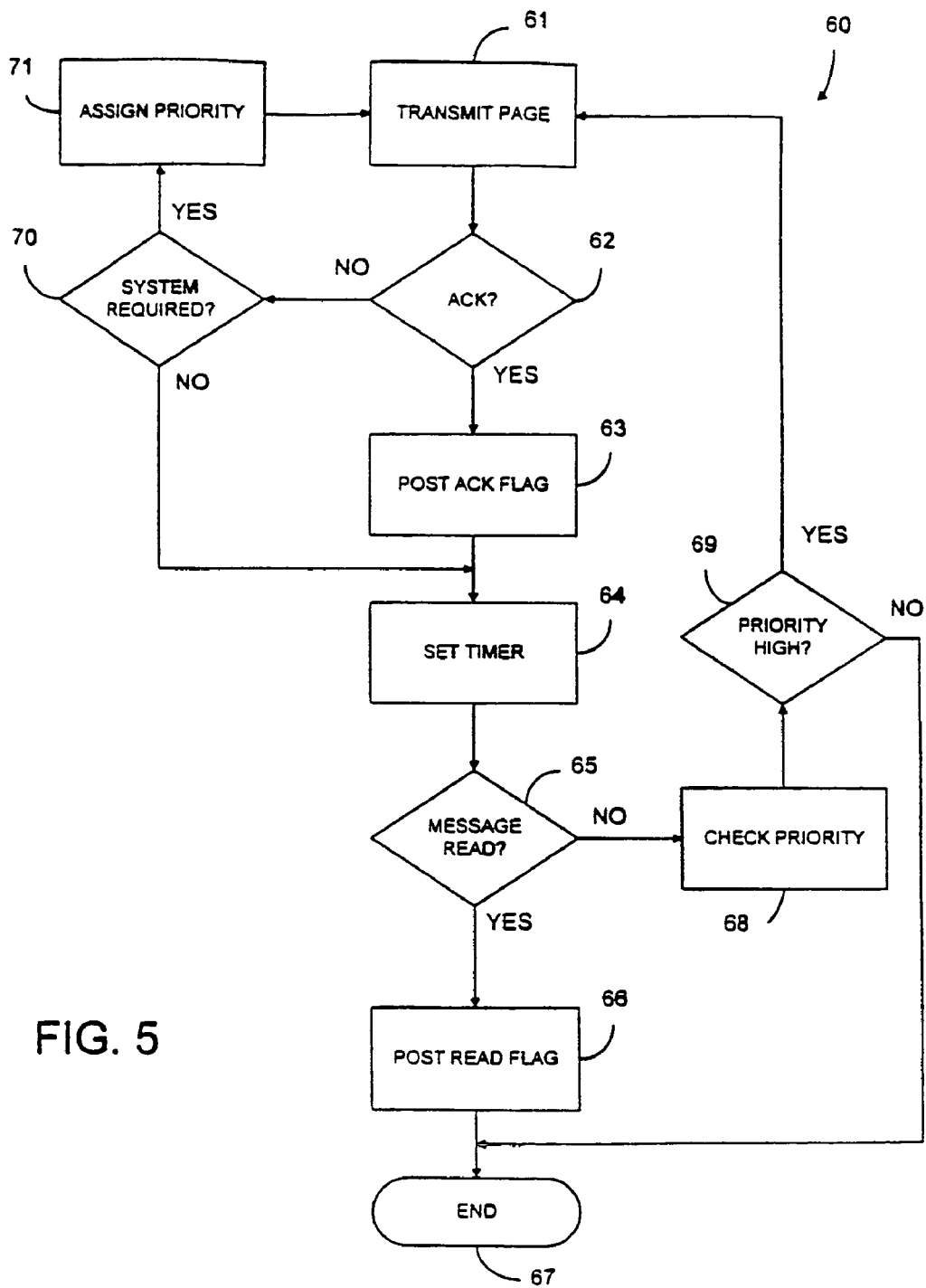
FIG. 5 is a flow chart depicting a paging process.

With reference to FIG. 5, a flow diagram 60 for performing a page call is shown. At step 61, the system 30 locates the current message flag from its transmission stack within paging terminal controller 31 and communicates with base station 34 for setting up a page call. The base station 34 transmits selective call signals and CI data to the targeted paging transceiver 100. At step 62, the system 30 determines whether an acknowledgment (Ack) was received from the paging transceiver 100 indicating that the page call was received. If an acknowledgment was not received, then at step 70 the system 30 determines whether an acknowledgment is a system 30 option. If an acknowledgment is required, then at step 71 the system 30 assigns the page call a priority in the transmission stack and eventually returns to step 61 for re-transmission. If the acknowledgment is received at step 62, the system 30 sets an acknowledgment flag (Ack flag) corresponding to the stored message.

If an acknowledgment is not a system requirement, as determined at step 70, or after posting the acknowledgment flag at step 63, the system 30 sets a timer at step 64 and waits a period of time before proceeding to step 65. At step 65, the paging terminal controller 31 determines if the stored message has been read. If the message has been read, then at step 66 the system 30 posts a read flag in the subscriber data base to indicate that the message was delivered and read and at step 67 the process ends.

If, at step 65, the message had not been read, then at step 68 the system 30 determines the priority of the message and proceeds to step 69. If the priority is high, as determined at step 69, then at step 61 the page call is returned to the transmission stack at the designated priority level for re-transmission. If, on the other hand, the priority is not high as determined at step 69, then the message has a low priority and the process ends at step 67.

Figure 6:
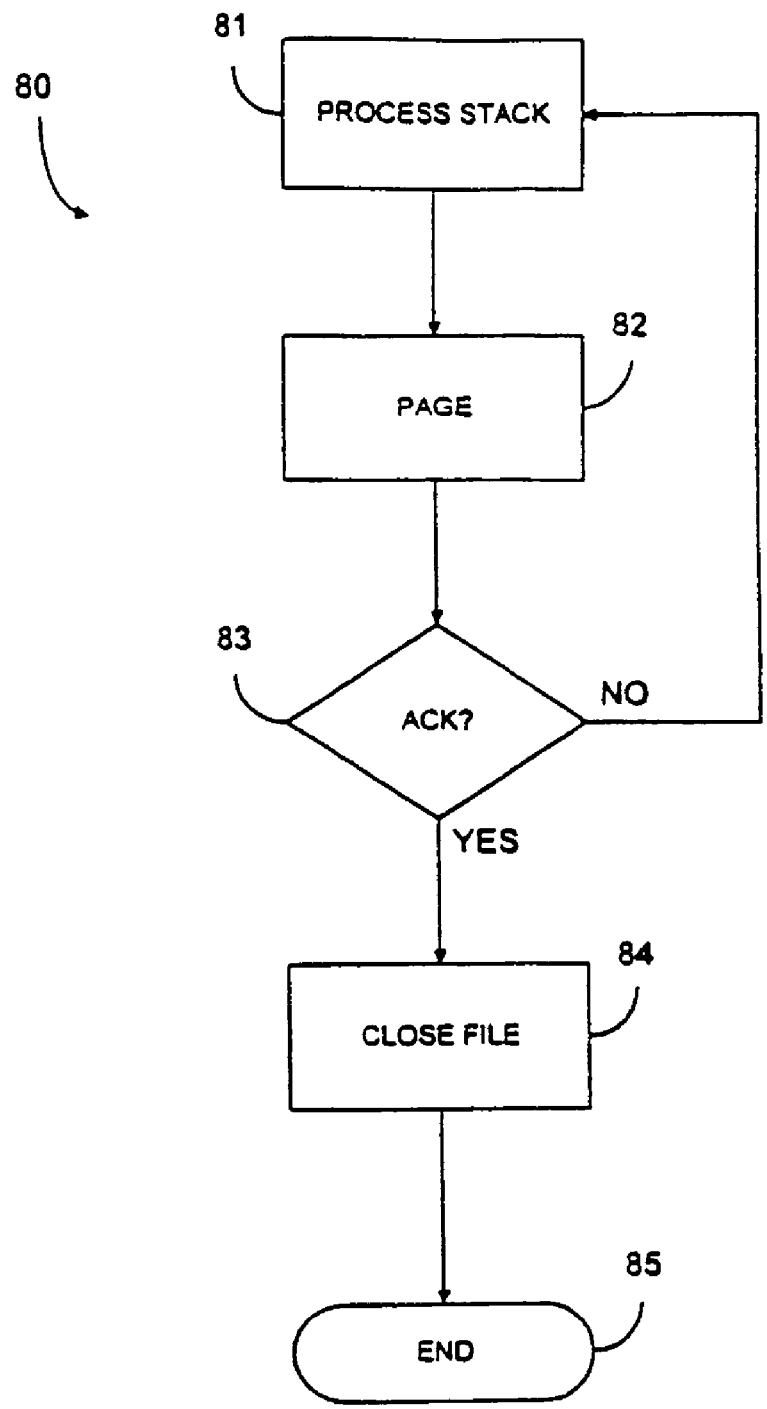
FIG. 6 a flow chart depicting of process of notifying a paging transceiver of an unread message.

An alternate routine 80 for notifying a paging transceiver 100 that an unread message is waiting is shown in FIG. 6. At step 81, the paging terminal controller 31 sorts through subscriber listings which have a corresponding unread and unnotified message in the storage and retrieval unit 32 and sends a page request to base station 34. At step 82, the switch 36 checks a home location registry (HLR) to determine the registered location and status of the remote paging transceiver 100. A page call is processed by transmitting selective call from transceiver base station 37 at step 82. If a page acknowledgment is desired for verification that the paging transceiver 100 recipient received the selective call signals, an Ack signal is manually or automatically transmitted from the paging transceiver 100 to base station 34 for storage in the subscriber database of paging terminal controller 31 at step 82.

At step 83, a notified flag is set in the subscriber data base corresponding to the unread message stored in the storage and retrieval unit 32 and the paging process for the current unread message ends at step 84. If at step 82 an acknowledgment signal was not received, the message is assigned a new priority and the process is subsequently repeated. Optionally, a plurality of priorities may be assigned to acknowledged and not acknowledged unread messages so that the paging transceiver 100 is sent a number of calls until the message is read by the subscriber.

In the preferred embodiment, the base station 34 is part of a mobile radiotelephone network and the paging transceiver 100 is paged over the designated paging channel or the control channels of the network. In addition to paging the paging transceiver 100, the short messages or other data transmitted to the paging transceiver 100 is also preferably transmitted over the paging channel or control channels. Although the paging is preferably performed through a mobile radiotelephone network, the selective call signals may alternatively be routed to a paging system for transmitting an address code and CI data over an independent paging transmitter. In such a configuration, the paging transceiver 100 may be configured to have a separate paging receiver or transceiver compatible with the paging transmitter or paging transceiver. Since radio pager devices require much less energy than portable cellular telephones, a paging transceiver 100 configured with a low energy paging receiver would reduce energy required for receiving selective call signals and allow high energy circuitry of the paging transceiver 100 to be turned off until the user needs to retrieve or transmit messages. Other variations and modifications will be apparent to those skilled in the art.

Figure 7:
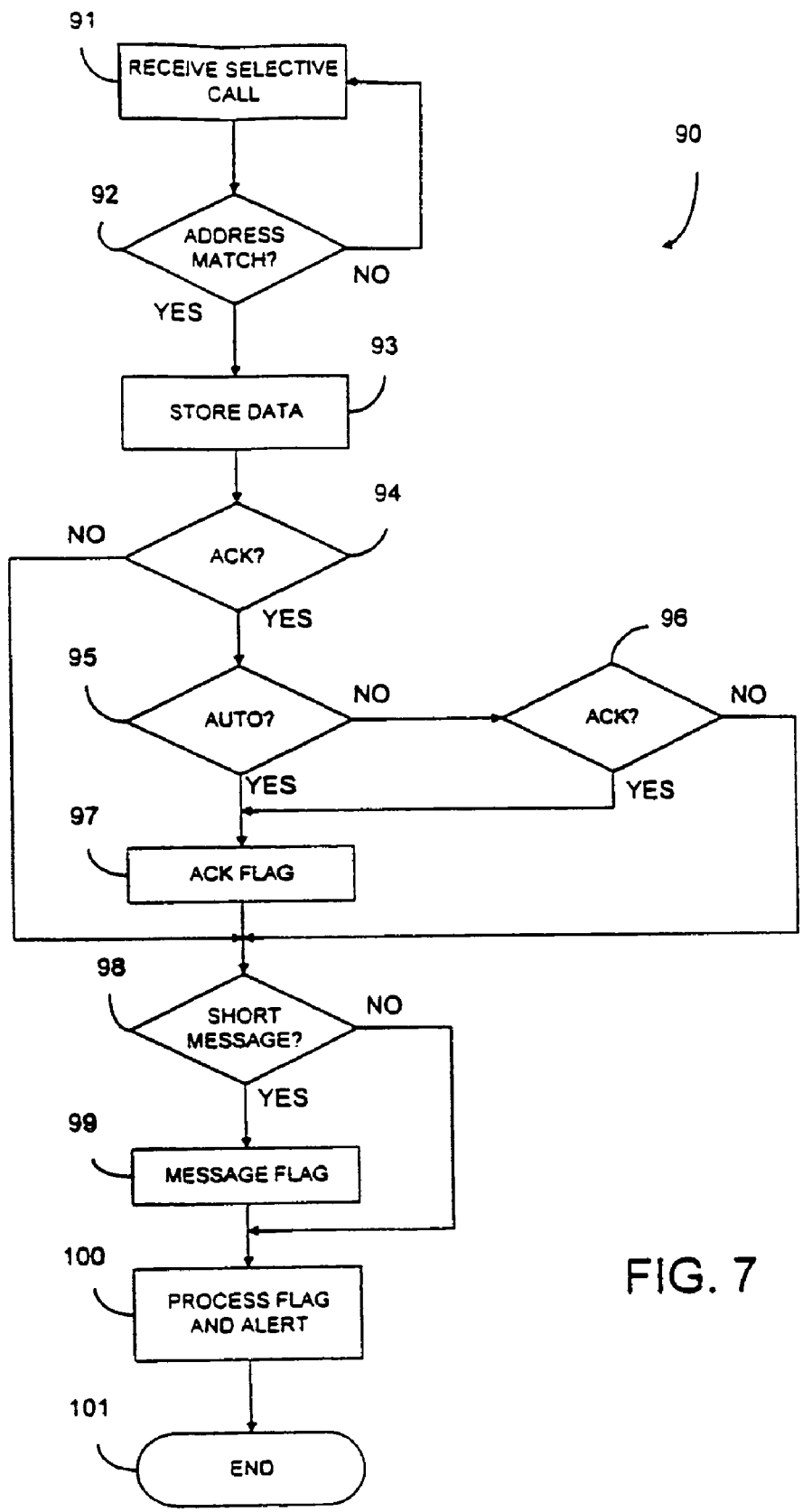
FIG. 7 is a flow-chart depicting a process of receiving a page at the paging transceiver of FIG. 1.

A process 90 for receiving messages at a paging transceiver 100 is shown in FIG. 7. A selective call signal including an address is received by receive section 21 of the transceiver 100 at step 91. At step 92, the demodulated signal is processed by the CPU 27 to compare the received address with an address code stored in the CPU 27 memory. If the received address code does not match the stored address, flow returns to step 91 and the transceiver 100 continues to monitor transmissions for its address. When the address corresponds to the pre-stored address code, as determined at step 92, the CPU 27 stores and processes any corresponding received CI data at step 93.

Next, at step 94, the CPU 27 determines if an acknowledgment transmission is required by the paging transceiver 100. The CPU 27 may always enable an acknowledgment in order to confirm at the system 30 or base station 34 that the selective call signals were received by the targeted paging transceiver 100. Alternatively, the CPU 27 may never enable an acknowledgment from the transceiver 100, which is useful in explosive environments where transmissions are dangerous and in environments where a reply from the paging transceiver 100 may cause harmful interference to other electronic equipment. The CPU 27 may, as another option, enable an acknowledgment only when acknowledgment data is contained within the received CI data, such as with a remote request. Finally, the CPU 27 may enable an acknowledgment in response to a user-enabled command.

Returning to step 94, if the paging transceiver 100 allows for an acknowledgment then at step 95 the CPU 27 determines whether the acknowledgment is required or if the acknowledgment is a user option. If the acknowledgment is required to be automatic, then an acknowledgment flag is set at step 97. If, on the other hand, the acknowledgment is not automatic but rather optional, then at step 96 the CPU 27 determines whether an acknowledgment has been enabled. If the acknowledgment has been enabled, then the acknowledgment flag is set in step 97.

At step 98, the CPU 27 determines whether short messages may be transmitted. Short messages may include CI data or any type of short coded message which was pre-stored by the user in the paging transceiver 100. If short messages are enabled, at step 99 the CPU 27 sets the short message flag. At step 100, the paging transceiver 100 transmits all flagged data, including CI data, to the base station 34 for processing by the system 30. The CPU 27 generates status information corresponding to received CI data and passes any necessary user status information to the user interface 3 for visual and/or audible reception by the user. For example the user may hear an alert beep, feel an alert vibration, view an LCD indicating the number of unread messages, view an animated graphic display, hear a synthesized voice indicating that an urgent message is waiting, or receive other types of indications. At step 101, the CPU 27 performs house keeping functions and the routine ends.

Figure 8:
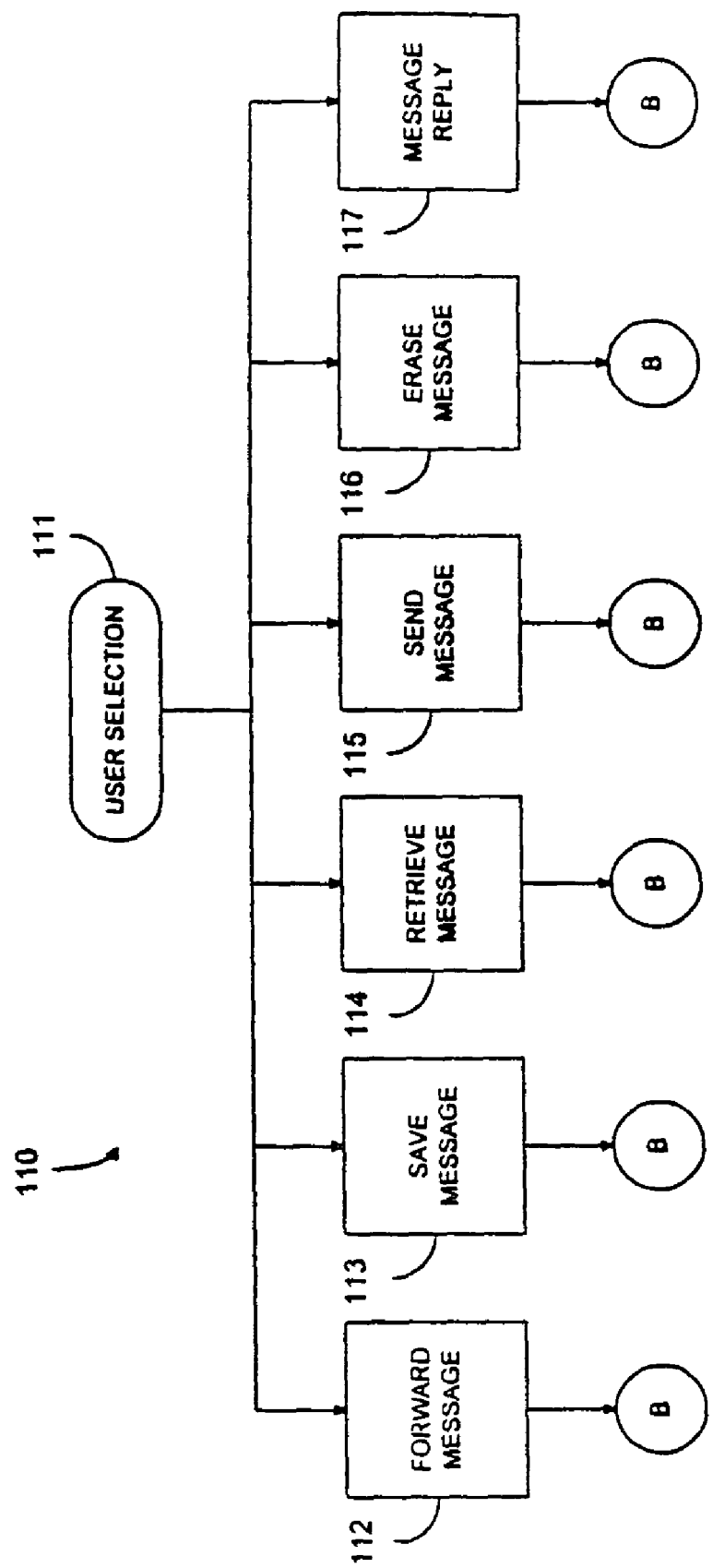
FIG. 8 is a flow chart depicting a process of selecting a function at the paging transceiver of FIG. 1.

FIG. 8 depicts a user function flow diagram 110 for user selectable function requests at the paging transceiver 100. At step 111, the user selects a function to be performed from available functions 112 to 117. These functions are exemplary functions that may be available and additional functions may exist. One or more of these functions are preferably selected through the user interface 3. The messages may be selected by the user to be forwarded to one or a plurality of addresses at step 112. Items such as messages and send message lists may be selected by scrolling through the message number or name. The selected messages for forwarding may reside at the paging transceiver 100 or at the system 30. The user may also select the function of saving a selected message at step 113. At step 114, selected messages are retrieved for reproduction and/or storage. At step 115 messages may be sent to another one or plurality or recipients, such as to another paging transceiver 100. At step 116, the selected message may be erased and at step 117, a reply may be sent to the originator of a selected message. With any of the functions selected at steps 112 to 117, the system 30 may act upon the entire information or, alternatively, may instead operate on only the message identifier. For instance, if the user selected the desired action of forwarding a message, the system 30 may send the entire message to a designated recipient or may instead send just the message identifier.

Figure 9:
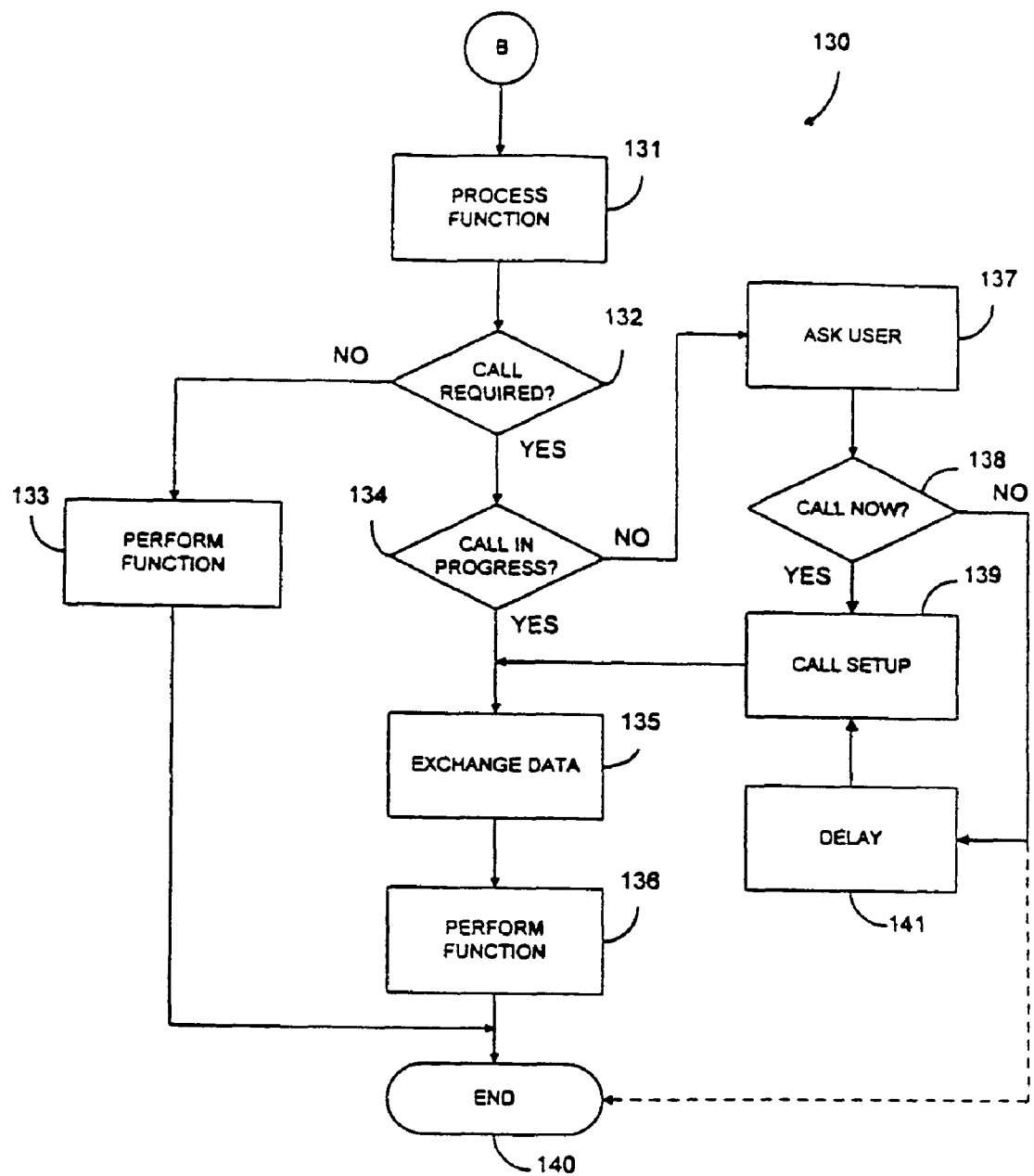
FIG. 9 is a generic flow chart depicting a selective process performed at the paging transceiver of FIG. 1 for executing a desired function.

FIG. 9 depicts processing performed by the paging transceiver 100 in response to the selection of any one of the functions 112 to 117 shown in FIG. 7. At step 131, the function is identified by the CPU 27 and other processing occurs prior to step 132 where the CPU 27 determines whether a call is required. If a call is not required to perform the function, then at step 133 the CPU 27 performs the requested function and the process ends at step 140.

If, on the other hand, a call is required, then at step 134 the CPU 27 next determines whether a call is already in progress. If a call is in progress, the CPU 27 exchanges data 135 with the system 30 and base station 34 at step 135 and the function is performed or executed at step 136. The data that is exchanged at step 135 includes a request signal that is sent from the paging transceiver 100 to the system 30 specifying the desired action and the particular information or message. If a call is not in progress, then at step 137 the CPU 27 preferably asks the user if a call should be made and receives the user's feedback at step 138. If the user elects not to call, then a delay occurs at step 141 with delay circuit 28.

As discussed above, the delay circuit 28 may be a timer which expires at a set time, such as at 1:00 a.m., when traffic and costs are low or may expire after a period of time, such as 1 hour. The set time or the period of time may be programmed by the user or may be determined by default values. Additionally, the delay circuit 28 may operate to delay operation until the signal strength is above a certain threshold. The delay circuit 2&, in this example, may therefore comprise a level detector and a comparator circuit for comparing the signal strength to the threshold level. The delay circuit 28 would therefore advantageously delay the paging transceiver 100 from initiating communication until signal strength is sufficiently high. Moreover, the delay circuit 28 may alternatively comprise a communication monitor circuit for determining when the paging transceiver 100 is communicating before performing a function. Also, the delay circuit 28 may detect transmissions and trigger a certain event in response to a received communication. As an example, if the paging transceiver 100 receives a certain type of message or a message from a particular source or individual, the paging transceiver 100 may automatically perform a programmed action. The paging transceiver 100 would therefore be able, for instance, to automatically forward all messages received from one recipient to a designated person.

After the timer 28 is triggered or if the user decides to call now, then at step 139 the CPU 27 sets up a call to the base station 34. Once a call is established, then processing proceeds to step 135 for the exchange of data and then to step 136 for the performance or execution of the function. At step 140, the process ends. The process shown in FIG. 9 is not limited to the performance of a single function but also represents the processing if the user selects a number of functions. For example, the user may select the functions of retrieving a message at step 114 and forwarding a message at step 112 and these functions may be performed in unison with each other or sequentially one after each other.

The paging transceiver 100 and system 30 may exchange status information during messaging calls initiated by the paging transceiver 100 or by selective call, such as page calls, initiated by the system 30. The status information may contain information corresponding to messages stored within the paging transceiver 100 or within the system 30. For example, if the system 30 erases a message that has resided in its memory for too long a period of time, such as an unsaved, read message, the system 30 may inform the paging transceiver 100 that the message no longer exists. If the message identifier stored in the paging transceiver 100 no longer corresponds to a message stored in the system 30 or in the paging transceiver 100, the CPU 27 removes the identifier for the no-longer existing message.

When the forward message function 112 is selected, flow proceeds to step 131 where the CPU 27 reads information pertaining to the message or plurality of messages selected by the user to be forwarded. The information may include a message identifier, location data, message length, message type, destination addresses, or other CI type data as previously described. At step 132, the CPU 27 determines whether the message cannot be forwarded without communicating with the system 30. At step 134, the CPU 27 determines if a call is in progress. If a call is in progress, CI data is exchanged at step 135 with the system 30 for forwarding messages. If the messages to be forwarded are located at the system 30, the messages are simply flagged for forwarding to the appropriate addresses. At step 136, the messages are forwarded and confirmation is communicated to the paging transceiver 100. If the message is not located at system 30, the message is transmitted from the paging transceiver 100 to system 30 at step 136 and the process ends at step 140. If at step 134, it is determined that a call is not in progress, the user is asked if the message should be forwarded now at step 137. If the user selects yes, a call is established with system 30 at step 139 and flow continues as previously described. If a call should not be made, the CPU 27 keeps the forwarding information in memory for forwarding the message during a subsequent call with system 30 and the process ends at step 140.

In operation, the user selects a message or messages to be forwarded and also selects a recipient for receiving the message. If the message resides at the system 30, the message is simply forwarded to the addressed recipient. If the message is located in the paging transceiver 100, the message is first transmitted to the system 30 at step 135 before it can be forwarded to the intended recipient. In order to conserve time, the system 30 will not accept receipt of a message from the paging transceiver 100 if the same message already exists at the system 30. The system 30 will simply perform the required function with the already present duplicate message.

If the function selected is the save message function 113, then at step 131 the message identifier to be saved is read by CPU 27. At 132, the CPU 27 determines if the message identifier selected corresponds to a message already stored in message memory 5 and if the selected function can be processed off-line. If yes, at step 133 the CPU 27 sets a save message flag in order to protect the message stored in message memory 5 from being over-written and the process ends at step 140.

If at step 132 the CPU 27 determines that the message is not stored at the paging transceiver 100, then at step 134 the CPU 27 determines whether a call is in progress. If a messaging call is in progress, CI data instructing the system 30 to save the message is sent. The system 30 flags the stored message and sends a message saved acknowledgment to the paging transceiver 100 at step 136. The CPU 27 converts the acknowledgment to status information and informs the user that the message is saved at the system 30 and the process ends at step 140. If at step 134, it is determined that the paging transceiver 100 is not currently in communication with the system 30, the CPU 27 flags the message identifier for saving and the user is asked if the call should be made now at step 137. If no, at step 138 the flag is kept for transmission to system 30 at a later time, such as during a selective call to the paging transceiver 100 or during a messaging call to system 30. If yes, then the CPU 27 sets up a call at step 139 for transmitting the save flag and CI data as previously described.

When the retrieve message function is selected at 114, then at step 131 the message identifiers corresponding to messages to be returned are read from the CPU 27 memory for retrieving the message. Additionally, the CPU 27 may read message location information, system ID information, address information, message length information, message type information as previously described. At step 132, the CPU 27 determines the location of the message and determines if a call to system 30 is required. If the message is stored in message memory 5, then at step 133 the CPU 27 retrieves the message. The message, for instance, may be an audio message, visual message, text message, or electronic signal intended to be transferred to another device.

At step 132, if the message does not reside in message memory 5, the CPU 27 determines that a call is required to retrieve the message and, at step 134, determines if a call is in progress. If a call is in progress, CI data, such as which messages to retrieve, message length, message type, and message identifier, is exchanged at step 135. At step 136, the message is retrieved and simultaneously stored in message memory 5 by the DSP 4. The appropriate status information corresponding to the message is stored by the CPU 27 in its memory and the process ends at step 140. If at step 134 a call is not in progress, the user is asked if the call should be made now or if during another call at step 137. At step 138, if the user chooses to place the call, the call is set up at 139. If the user chooses to delay the call until another session, the message is left flagged for retrieval at the next session and the process ends at step 140. With the timer 28, the message may be retrieved at a chosen time or a retrieval instruction may be sent from system 30 to paging transceiver 100 for causing the paging transceiver 100 to automatically retrieve a message or plurality of messages at a time designated by system 30. For example it may be desirable to have emergency weather information automatically retrieved during night-time hours when telephone line charges and air time charges are less expensive. The above described options may also be utilized for forwarding messages, erasing messages, saving messages, sending messages, and replying to messages as will be shown in more detail hereinafter.

With the send message function 115, in order to send a message, the message must first be stored at the paging transceiver 100 or at the system 30. The process of storing or recording messages is well know to those of ordinary skill in the art and accordingly will not be described in further detail. Examples of these devices are described in U.S. Pat. No. 4,602,129 to Matthew, et al., titled "Electronic Audio Communications System With Versatile Message Delivery," and in U.S. Reissued Patent No. Re. 34,976 to Helferich et al, titled "Analog/Digital Voice Storage Cellular Telephone," both of which are incorporated herein by reference. The system 30 and paging transceiver 100 can record, store and retrieve a plurality of different types of messages as previously described depending on the application required.

If the send message function 115 is selected, the CPU 27 identifies the message to be sent and cross references it to the selected recipient address information. At step 132, the CPU 27 determines whether a call is required at step 132. The subsequent processing of sending a message should be apparent from the description above for forwarding a message and accordingly will not be duplicated in order to simplify description of the invention. The message to be sent may reside in the paging transceiver 100 or in the system 30. If the message resides in the system 30 and in the paging transceiver 100, the message in the system 30 corresponding to the CPU 27 message identifier will be sent in order to conserve air time. If the message does not reside in system 30, the message will be sent from the paging transceiver 100 to the system 30. If the message is to be sent from the paging transceiver 100, the message may be a pre stored message or alternatively, the message may be transmitted to system 30 by paging transceiver 100 in real time during a call session between system 30 and paging transceiver 100.

If the erase message is selected at step 116, the erase message function allows a user to erase messages stored at the system 30 or at the paging transceiver 100 depending on the mode of operation. A message may be erased at a paging transceiver 100 without erasing the message identifier. If a message is erased at the paging transceiver 100 and the identifier still exists in message memory 5, the message can be retrieved from the system 30. In order to remove a message identifier at the paging transceiver 100, the message must be erased at the system 30. This feature causes the user to manage the messages at the platform, thereby conserving memory space at the storage unit 32. At step 131, the selected message to be erased is identified and the user is asked if the selected message in the paging transceiver is to be erased or if both copies of the message are to be erased. If the local message only is selected to be erased, the message identification information is kept and at step 133 the CPU 27 flags the message stored in memory 5 for erasure or overwriting. In other words, the message still exists but may be over-written by another message when memory space is required and, until then, may be retrieved from message memory 5. If at step 132 a decision was made to erase both copies of the message, then at step 134 the CPU 27 determines if a call is in progress. If yes, at step 135 the CI data is exchanged instructing system 30 to erase the message. At step 131, the system 30 transmits an acknowledgment that the message was erased, the CPU 27 flags the local message for erasure, the identifier is removed and both copies of the message and the identifiers are erased.

If at step 134 the CPU 27 determines that a call is not in progress, the CPU 27 at step 137 erases the local message and the user is asked if the system 30 copy of the message needs to be erased now. If yes, the call is established at step 139 and the process continues as previously described. If no, the necessary flags are set for erasing the remote message during the next communication with system 30 and the timer 28 is activated. The timer 28 may be utilized for a timed erase of the message stored at system 30.

The message reply function 117 is for sending a reply to an already received message. A reply message utilizes the same process as the send message function except that a return address is already correlated to the message targeted for a reply. During the send message function 115, the user is required to select an address or destination for the message to be sent. In other words, the user must know the destination or address in advance. The message reply function 117 does not require that the user know the address of the recipient because the message being replied to has a corresponding return address. As with the send message function 115, a reply message may be sent in real time or it may be pre-recorded and stored in the paging transceiver 100 for transmission to system 30. Additionally, the reply transmission may be delayed for a set period of time as previously described with timer 28.

In summary, as discussed above with reference to FIGS. 5 and 6, the system 30 does not transmit the entire message to the paging transceiver 100 but rather notifies the user that a message is waiting. The paging transceiver 100, as discussed above with reference to FIG. 7, stores data associated with the page and possibly a short message. The user can then select a desired one of plurality of available functions, such as those shown in FIG. 8, and the paging transceiver 100 will process the request in accordance with FIG. 9.

With the system 30 and paging transceiver 100, the paging transceiver 100 can notify a user of a message without receiving the entire message. The user can then decide to act upon the message at a time convenient to the user. Rather than receiving the message with the alert, as occurs with conventional paging receivers, the user can control the time when he or she wants to receive a message and may even decide not to retrieve the message. After the user has been notified, the user can then control the paging transceiver 100 to retrieve the message from the system 30, to save the message at either the system 30 or paging transceiver 100, to forward the message to an indicated recipient, to reply to the message, or to erase the message from the paging transceiver 100 or from the system 30.

With paging transceiver 100, the user can position the paging transceiver in a desired location before initiating communication with the system 30. Thus, if the user is paged by system 30 while the user is in a subway, basement, or on an airplane, the user can postpone the delivery of the message until the paging transceiver 100 is in a better location to receive and reply to the message. Similarly, the user may be in an explosive environment or near sensitive electronic equipment and may postpone delivery of the message and a reply from the paging transceiver 100 until the user is out of the explosive environment or far enough away from the sensitive electronic equipment. The paging transceiver 100 and system 30 therefore give the user control over the messages stored in the system 30.

The paging transceiver 100 and system 30 conserve both valuable air time and also paging transceiver message memory 5. The system 30 does not automatically deliver each message to the intended paging transceiver 100 but instead allows the user to exercise control over the message. Since a message may be many bytes in length, perhaps kilobytes, megabytes, or even greater, the benefit to the system 30 and to the base station 34 in not having to transmit each message can be quite substantial. Also, since each message is not automatically delivered to the paging transceiver 100, the paging transceiver 100 does not become overloaded with messages and instead the user can choose to act on selective messages, such as by retrieving only certain messages. The user, additionally, may decide not to act on any of the messages through base station 34 and may call the system 30 through the PSTN 35, thereby bypassing the base station 34 and its associated charges and expenses.

The paging transceiver 100 and system 30 are not limited to voice messages in a paging system. Rather, the paging transceiver 100 and system 30 may operate with any type of message or information, including, but not limited to numeric messages, alphanumeric messages, voice or other audio messages, video messages, graphics or even data. The paging transceiver 100 may be a separate paging transceiver, may be integral with a mobile radiotelephone, or may be incorporated into other devices.

For instance, the paging transceiver 100 may be integrated into a portable radio, CD, or tape player. The paging transceiver 100 could receive messages from system 30 which indicate portions of songs that may be sampled by the user. The user may browse through a listing of available music and select a desired song. The paging transceiver 100 then communicates with the system 30 to retrieve the selected song and the user can then play the song at the paging transceiver 100.

As another example, the messages may be video messages which the user can browse through and select only desired messages. The paging transceiver 100 may be integral with a television set and the video messages may be promotions for new movies or shows. Alternatively, the paging transceiver 100 may be integral with a game console and the video messages may be clips of new games that are available with that game console. Other applications for the paging transceiver 100 and system 30 will be apparent to those skilled in the art.

The information or message available to a paging transceiver 100 need not be static but instead may be dynamic. In other words, when a paging transceiver 100 is alerted that information is available, the information may be updated or otherwise change from the time that the user was alerted. As an example, the user may receive a weather alert and by the time the user decides to receive the information the information would be updated to reflect current weather conditions. The identifier for the information therefore does not limit the content that may be stored as the information available to the user.

The system 30 is not limited to transmitted only one alert at a time to one paging transceiver 100. Instead, the system 30 may send a plurality of alerts to a single paging transceiver 100 and each of those alerts may be broadcast to a plurality of paging transceivers 100. For instance, the system 30 may broadcast information to a plurality of transceivers 100 that share a common set of numbers within their mobile identification numbers. If the system 30 sends a plurality of alerts to a paging transceiver 100, these alerts may be displayed by the user interface 3 and the user can scroll through and act upon the messages as desired.

As discussed above, the system 30 and paging transceiver 100 allows information to be remotely acted upon by the paging transceiver 100. The system 30, however, also allows users access to their information via conventional ways, such as the PSTN 35. Therefore, a user may receive the alert with a paging transceiver 100 and decide to call in through the PSTN 35 to listen or otherwise act upon the message. The system 30 preferably is connected to the Internet whereby users can also gain access and act upon their information via the Internet.

The paging transceiver 100 preferably alerts the user both when a message identifier signal has been received and when complete messages have been received. The alerts may comprise any suitable indication to inform the user that the paging transceiver 100 has received a communication, such as a tone, vibration, or visual display. The alerts for a received identifier and for a received message are preferably different so as to allow a user to easily differentiate between the two communications.

Figure 10:
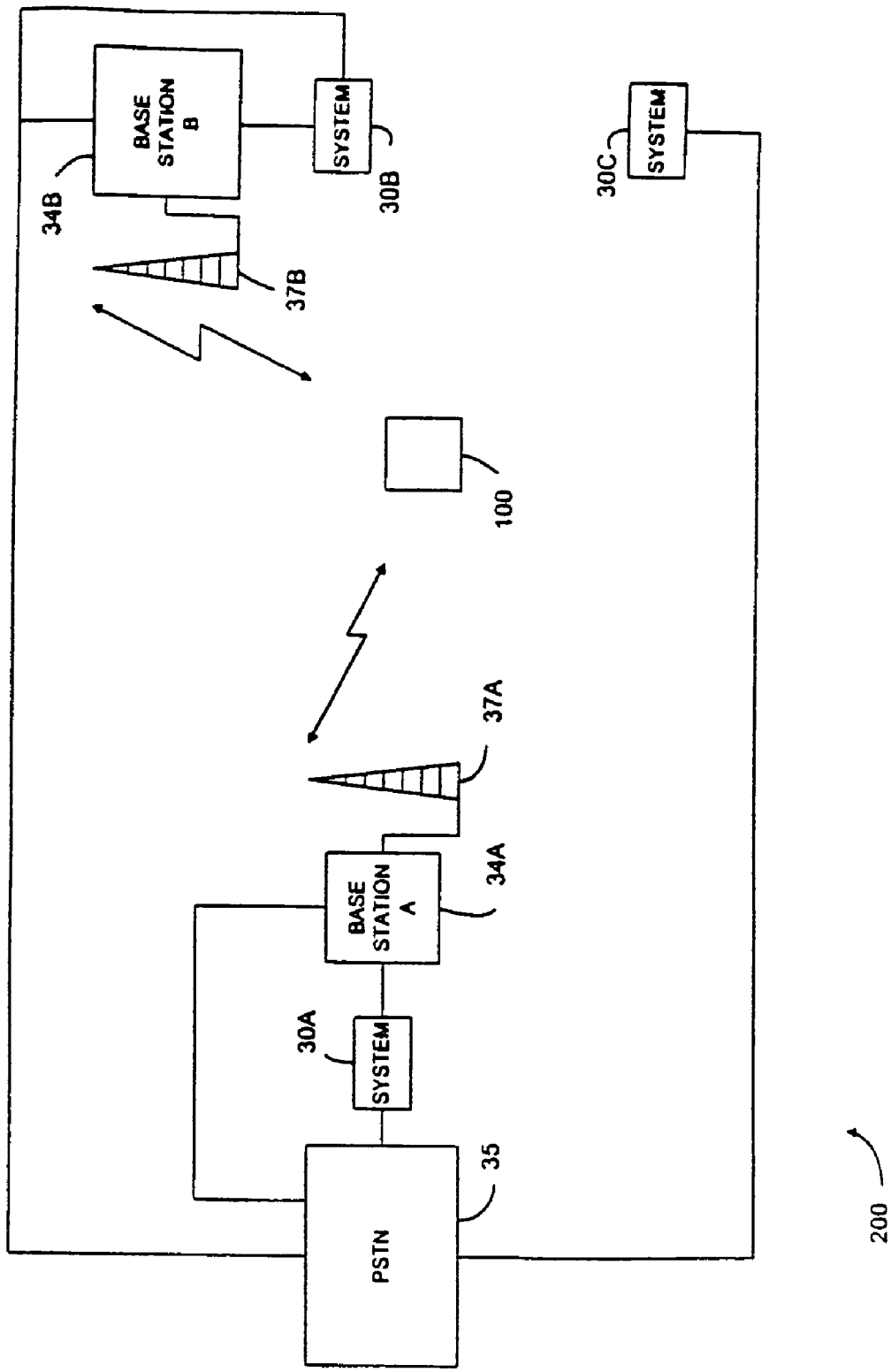
FIG. 10 is a block diagram of a paging system having multiple systems for storing messages.

The example provided in FIG. 3 was a single system 30 for storing messages on behalf of a plurality of paging transceivers 100. The invention, however, may include any number of systems 30 for storing messages with each system 30 storing information for a transceiver 100 being considered a content provider. For instance, as shown in FIG. 10, a messaging system 200 may comprise a plurality of systems 30 connected to the PSTN 35 with system 30A being associated with base station 34A and transceiver antenna 37A and system 30B being associated with base station 34B and transceiver antenna 37B. Although three systems 30 are shown, the system 200 may include any number of systems 30 and, although two base stations 34 are shown, each system 30 may be associated with a base station 34 and transceiver antenna 37 or only one of the systems 30 may be associated with a base station 34 and transceiver antenna 37. Furthermore, each system 30 need not include a paging terminal controller 31 or a storage unit 32. System 30C, for instance, may include a storage and retrieval unit 32 and input/output controller 33 but not a paging terminal controller 31 and may page the paging transceiver 100 through the paging terminal controller 31 in system 30A. Conversely, a system 30, such as system 30A, may include a paging terminal controller 31 and an input/output controller 33 but not a storage and retrieval unit 32. Further, the input/output controller 33 need not be a separate unit but may be incorporated into the paging terminal controller 31 if the system 30 does not include a storage and retrieval unit 32, or into the storage and retrieval unit 32, if the system 30 does not include a paging terminal controller 31. The systems 30 and base stations 34 may communicate with each other through the PSTN 201 or through links or lines other than or in addition to the PSTN 201, such as through an SS7 backbone of a wireless network or through the Internet.

Additionally, each of the base stations 34A and 34B may be part of a paging network but is preferably part of a cellular network. Either one or both of base station 34A or 34B may page the paging transceiver and either one or both of the base stations 34A or 34B may deliver the contents of messages to the paging transceiver. Each of the systems 30A, 30B, and 30C may store messages on behalf of a user with the messages being of the same or different types. Furthermore, the messages stored within a single system 30 may be all the same type or may differ from each other.

As an example, system 30A may store voice mail messages and email messages directed to the user's office, system 30B may store voice mail messages directed to the user's home, and system 30C may store audio messages. The base station 34A acts as a clearinghouse for all messages delivered to the user to any of the systems 30 and pages the paging transceiver 100 whenever a message is received. Thus, when a voice mail message or email message is received at system 30A, the system 30A delivers a page to base station 34A which is then delivered to paging transceiver 100. When a voice message is received at system 30B, the system 30B sends information about the message to system 30A and system 30A, then delivers a page to base station 34A for delivering the page to the paging transceiver 100. Similarly, when system 30C has an audio message it notifies system 30A and system 30A acts to have the page delivered to the paging transceiver 100.

Figure 11:
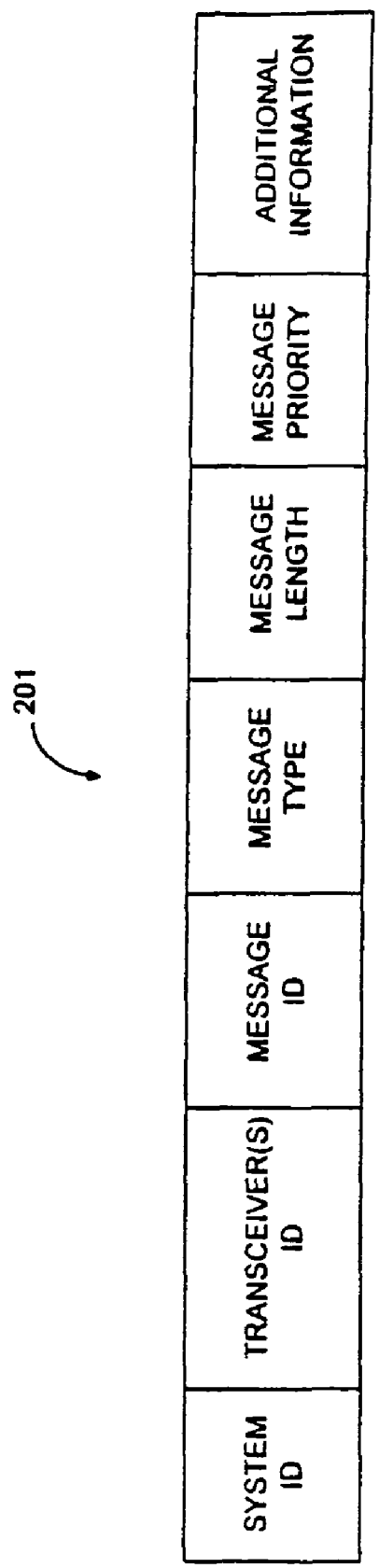
FIG. 11 is a diagram of a data transmission for the system in FIG. 10.

An example of the data transmission 201 sent from system 30B or 30C to system 30A is shown in FIG. 11. The data transmission 201 includes system ID information for identifying the system 30 from a potential plurality of systems 30. The system ID information may be an address code or may comprise the telephone number of the system 30 and may be automatically captured by system 30A, such as from Caller ID or from DNIS information. The data message 201 also identifies the paging transceiver(s) 100, such as with an address code or MIN. For many systems 30, the message or information stored will often be for a single user whereby the transceiver ID would be the address code or MIN for that single paging transceiver 100. For other systems 30, however, the system 30 may want to broadcast a single message to a plurality of paging transceivers 100 whereby the transceiver ID may be a code that identifies a predefined group of paging transceivers 100.

The data transmission 201 also includes message information. The message information includes information identifying the message and preferably also includes information specifying the type of the message, the length of the message, and the message priority. The message identification may identify the message with a unique code, such as a number, or may specify the address in system 30 for the message. The message type advantageously indicates whether the message is a voice message, email message, audio message, video message, or text message. The message length indicates the size of the message and the message priority indicates the priority level of the message. For instance, the user can designate priorities based upon the telephone number of the caller leaving the message or the priority may be set by the caller. Although the data transmission 201 preferably includes this information, the data transmission 201 may include additional or fewer fields than the example provided in FIG. 11.

The data transmission 201 also includes additional information that may be relayed and presented to the user. For instance, for many systems 30 that receive and store messages on behalf of the user, the additional descriptive information preferably comprises a return address for identifying the caller's telephone number to inform the user as to who left the message. For other systems 30 which may generate their own information, the additional information preferably describes the information available to the user. For instance, for a system 30 that allows users to sample songs, the additional information would indicate the title and the artist of the song and may also specify the cost to retrieve and play the song. Other uses of the additional information will be apparent to those skilled in the art.

The page sent to the paging transceiver 100 includes most, if not all, of the data transmission 201. The information transmitted to the paging transceiver 100, with reference to FIG. 7, may be inserted into a short message transmitted to the user at step 98. From the system ID information, the paging transceiver 100 can determine which system 30 it needs to respond to in order to act upon a message. For instance, system 30A may page the paging transceiver 100 and indicate that system 30B has a stored message. If the user selects the function of retrieve function, then the paging transceiver 100 can contact system 30B through base station 34B to retrieve the desired message. The paging transceiver 100 as discussed above may instead respond to base station 34A to retrieve the message and base station 34A would communicate with system 30B to retrieve or otherwise act upon the message.

The message information is used by the paging transceiver 100 to inform the user of the message or information stored at the system 30. The message type, length, priority, and additional descriptive material may be displayed or otherwise indicated to the user at the paging transceiver 100. From this information, the user can decide what type of action to take upon the message or information at the system 30.

As described with reference to FIG. 9, a call to the system 30 may be required in order for the paging transceiver 100 to perform a desired function. If a call is required, the paging transceiver 100 relays information in the data transmission 201 to the system 30. If the paging transceiver 100 responds to a system 30 other than the one storing the message or information, the paging transceiver 100 identifies the system 30 storing the message or information and also identifies the message. As discussed above, the message may be identified in a number of ways, such as with a message code or by specifying the location in memory where the message is stored. The call to the system 30 would automatically provide the transceiver identification information to the system 30, although the paging transceiver 100 could provide this information with the other information provided to the system 30.

Upon receiving a call from the paging transceiver 100, the system 30 reads the transceiver identification and message information to find the information requested by the paging transceiver 100. The information obtained from the paging transceiver 100 at the system 30 and the transfer of the requested information to the paging transceiver occurs at step 135 in FIG. 9.

The system 200 can present substantial cost savings to conventional paging systems. With a conventional paging system, the entire message is transmitted to the location of the paging transceiver 100. For instance, if the user's home base is in Chapel Hill, N.C., and the message originates in Chicago, Ill., then the message is typically sent over the PSTN 35 to the home base. With nationwide paging, the user may have traveled to San Diego, Calif. whereby the home base would then send the entire message from Chapel Hill to San Diego. With system 200, on the other hand, only the data transmission 201 is transmitted from Chicago to Chapel Hill and from Chapel Hill to San Diego. The actual message, in contrast, is sent directly from the storage facility in Chicago to San Diego, thereby reducing charges associated with the transfer between Chicago and Chapel Hill. Moreover, the data transmissions 201 between systems 30 may occur over the Internet. These transmissions, for instance, may be formatted according to the Voice Profile for Internet Mail (VPIM) and the addresses of the transceivers 100 may be determined from an open directory service, such as the Lightweight Directory Access Protocol (LDAP) or X.500.

The systems 30 and 200 allow a user to easily manage the multitude of message that are commonly received every day. Conventionally, a user would have to call in to the office voice mail to retrieve voice messages, call home to retrieve voice messages sent to the house, and connect with the computer network at the office to retrieve email messages. Although paging systems have been used to notify a user that a voice mail message or other message has been received, the user would still have to call in to a separate system to actually retrieve the message. The system 200, on the other hand, enables a-user to be notified of all messages, regardless of their type and regardless of their location and furthermore allows the user to selectively retrieve, save, erase or perform other functions on the messages. The systems 30 and 200 and paging transceiver 100, moreover, allow the user to exercise control over the remotely stored messages; the user can selectively store, save, retrieve, erase, forward, send or otherwise perform operations on messages stored at a remote location.

The forgoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What is claimed is:

1. A paging transceiver, comprising:
  a receiver for receiving a selective call signal having an information identifier signal identifying remote information available to the paging transceiver;
  a processor for receiving the information identifier signal and for generating an alert signal after receiving the information identifier signal;
  a user interface for receiving the alert signal and for generating an alert to inform a user that the information identifier signal has been received, the user interface also for receiving input from the user designating a desired action on the available information;
  the processor for detecting the input at the user interface and for generating a request signal indicating the desired function, the request signal including at least part of the information identifier signal; and
  a transmitter for transmitting the request signal to a system so that the desired function may be performed on the information identified by the information identifier signal.

* * * * *